US012488181B2

(12) United States Patent
Hotson

(10) Patent No.: US 12,488,181 B2
(45) Date of Patent: Dec. 2, 2025

(54) SEMANTIC SCRIPT LANGUAGE PROCESSING

(71) Applicant: Autodesk, Inc., San Rafael, CA (US)

(72) Inventor: Clayton P. Hotson, Kensington, CA (US)

(73) Assignee: AUTODESK, INC., San Francisco, CA (US)

( * ) Notice: Subject to any disclaimer, the term of this patent is extended or adjusted under 35 U.S.C. 154(b) by 644 days.

(21) Appl. No.: 17/710,663

(22) Filed: Mar. 31, 2022

(65) Prior Publication Data

US 2023/0315986 A1 Oct. 5, 2023

(51) Int. Cl.
*G06F 40/279* (2020.01)
*G06F 40/253* (2020.01)

(52) U.S. Cl.
CPC .......... *G06F 40/279* (2020.01); *G06F 40/253* (2020.01)

(58) Field of Classification Search
CPC ............................ G06F 40/279; G06F 40/253
USPC ............................................................. 704/9
See application file for complete search history.

(56) References Cited

U.S. PATENT DOCUMENTS

2024/0007558 A1* 1/2024 Zhang ................ H04L 12/1818

OTHER PUBLICATIONS

Chowdhary, et al., "Natural Language Processing", Ch. 19, Fundamental of Artificial Intelligence, pp. 603-649, Apr. 2020 (Year: 2020).*
"Assignment problem", Wikipedia, https://en.wikipedia.org/wiki/Assignment_problem, last edited Jul. 29, 2022, pp. 1-4.
"Ray-casting algorithm—Rosetta Code", Wikipedia, https://rosettacode.org/wiki/Ray-casting_algorithm, last edited Dec. 11, 2021, pp. 1-73.

* cited by examiner

*Primary Examiner* — Tsu-Chang Lee
(74) *Attorney, Agent, or Firm* — Gates & Cooper LLP

(57) ABSTRACT

A method and system provide the ability to process source computer instructions. The source computer instructions are obtained and include input statements that consist of two functions and one or more arguments. The two functions are competing with each other for consumption of the one or more arguments. For an input statement, an inherent numeric precedence weight is determined for each function and argument. All possible legal configurations of the functions and arguments are determined and consist of different groupings of the functions and arguments. A score is assigned to each grouping and consists of a sum of the weights within each different grouping. The grouping and legal configuration having the highest score is selected. The input statements are compiled into executable code using the selected different grouping.

26 Claims, 8 Drawing Sheets

SEMANTIC SCRIPT LANGUAGE PROCESSING

BACKGROUND OF THE INVENTION

1. Field of the Invention

The present invention relates generally to computer programming languages, and in particular, to a method, apparatus, system, and article of manufacture that utilizes a language processing layer that allows users to provide instructions and queries in a human-readable way.

2. Description of the Related Art

Computer programming languages can be complex and technical requiring a programmer to learn a language's syntax in a manner that is not obvious or inherent to non-programmers. While computer languages (e.g., scripts and/or natural language processing) have attempted to make it easier for non-programmers to easily understand and use, the prior art has failed to sufficiently lower the bar of complexity to enable use by non-programmers.

Programming languages come in many flavors (e.g., CoffeeScript, ANSI Standard Basic, Factor, Haskell, C, Common Lisp, JavaScript, etc.). However, when describing particular algorithms, many people use pseudo-code. Prior art systems fail to provide the ability to actually write code using pseudo-code.

In view of the above, it is desirable to provide a computer language that lowers the bar of complexity for technical people who want to express domain expertise intended for a computer to understand but are not themselves computer programmers.

SUMMARY OF THE INVENTION

Embodiments of the invention, provide the ability to treat any expression functionally and/or computationally. In addition, embodiments of the invention provide the ability to utilize machine learning/artificial intelligence to update a compiler/machine when an expression is misunderstood/misinterpreted. Further, embodiments of the invention define tools to promote logical expressiveness for the author to effectively convey his/her knowledge and expertise for the following at the same time: (a) to other human readers for dissemination and validation; and (b) to a machine for execution, querying, and training.

In view of the above, embodiments of the invention, also referred to herein as Semantic Script or the Semantic Script Programming Language (SSPL), provide a human-computer interface layer that is devised as a means of lowering the bar of complexity for technical people who want to express domain expertise intended for a computer to understand but are not themselves computer programmers. Embodiments of the invention are designed to allow a single technical procedure to be understood by computer and domain experts alike. Further, embodiments of the invention provide a language processing layer that allows users to provide instructions and queries to the computer in a human-readable way. Statements in the SSPL can be expressed in a variety of forms, allowing the user the ability to convey logic in the way that makes the most sense to them.

Embodiments of the invention may implement the Semantic Script programming language as a stack-oriented, concatenative and procedural programming language that minimizes the use of symbology to define syntax and scope. Further, the SSPL may rely on words to carry meaning to both the notional program space as well as the syntactic sentence space.

BRIEF DESCRIPTION OF THE DRAWINGS

Referring now to the drawings in which like reference numbers represent corresponding parts throughout.

DETAILED DESCRIPTION OF THE INVENTION

Figure 1:
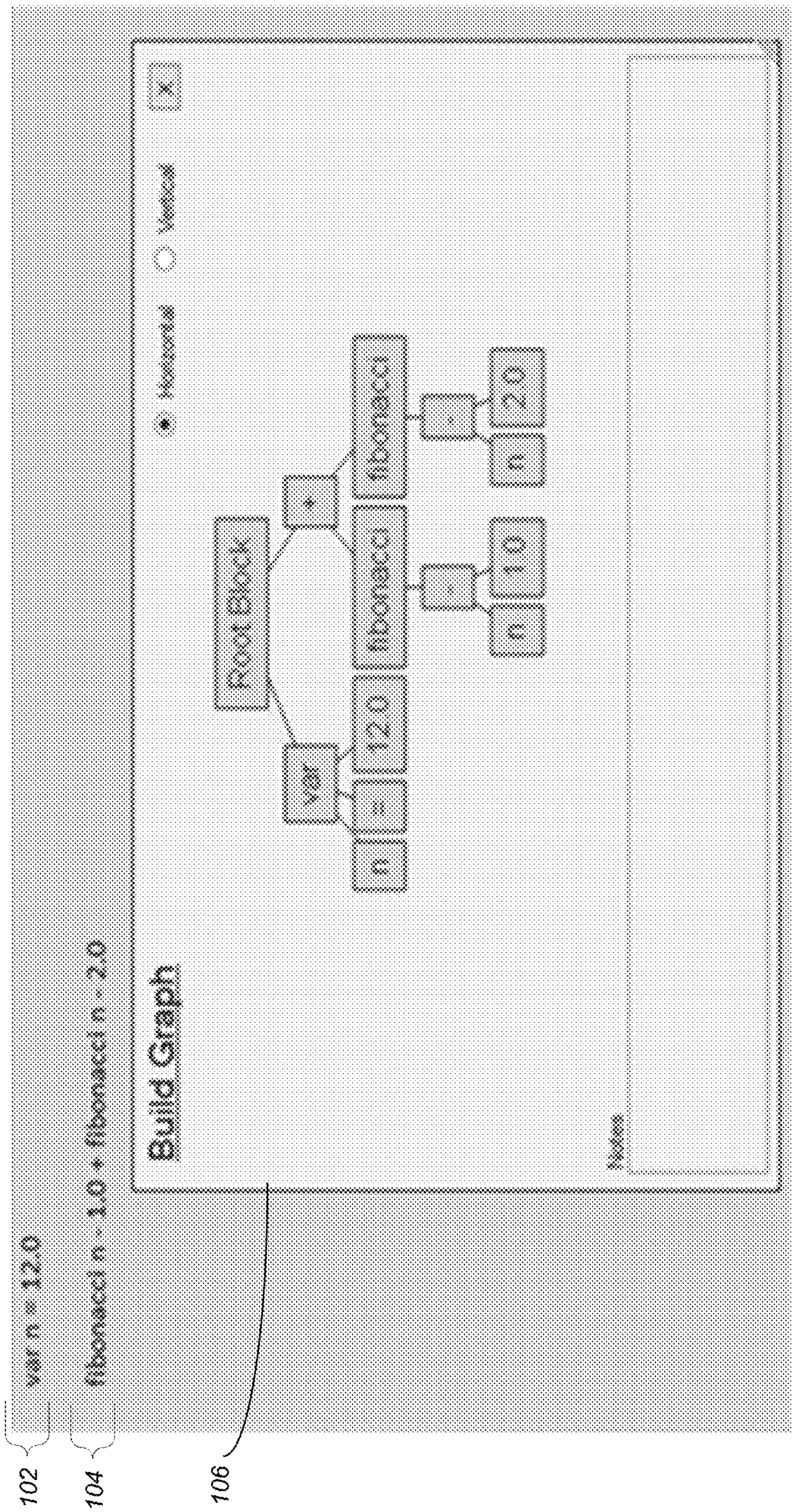
FIG. 1 illustrates an Editor showing a variable declaration and a Fibonacci expression code snippet in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Definitions

The following terms are used consistent with the definitions stated.

Source Code/Source Input: Input text representing logical procedure meant to be interpreted by the computer.

Parts of Speech/POS: Traditional grammatical parts of speech; nouns, verbs adjectives etc.

Dictionary: The word dictionary is defined to map words to defined resources such as variables and functions.

Scope: The region of source code where an identifier name (e.g., variable or function name) may be used unambiguously.

Plain Text: Text comprised of generally readable characters but not of graphics or control characters.

Statement: A single executable action that does not express a value.

Expression: A single executable action that expresses a value on the stack.

Parameter: An interface defined to provide a typed input value to a defined function. Normally, the parameter is identified by name.

Argument: A value provided to a function from a caller that fills a parameter.

Caller/call site: The location in source code that calls a function. Where it is used.

String: A sequence of characters bounded by quotation marks. Example, "This is a string".

Stack: Linear data structure that maintains element order by limiting the placement and retrieval of elements to one side of the structure; the top. Elements may be pushed onto the top, one by one, or popped off the top one by one.

Stack Effect: The net effect an expression has on the state of the stack.

Notion: A single underlying value represented by 1 or more words.

Run Time: In all programming languages, run time is referred to as the time at which the program is evaluated and generates its primary result.

Compile Time: In programming languages that are not interpreted, compile-time is referred to the time at which the semantics of the program are interpreted for the machine to execute. Compile time is explicitly independent, and always prior to run time.

Statically Typed: Statically typed is a programming language characteristic in which expression (variable and function expression) types are explicitly declared and thus are determined before use (typically at "compile time").

Assignment Optimization: A procedure to consider many possible combinations of a finite set of objects and select a single optimal object based upon a set of performance criteria.

Isa: A categorical assignment. A dog is a mammal.

Overview

The SSPL is a language processing layer that allows users to provide instructions and queries to the computer in a human readable way. The SSPL can be expressed in a variety of forms, allowing the user the ability to convey logic in the way that makes the most sense to them. Under the hood, the SSPL is a fully-fledged programming language that can be used to define complex procedures by supporting traditional programming functions and structures. However, because the SSPL does not require formal programming syntax, definitions can also be made in a more natural, conversational style, which non-programmers can more easily understand.

Expressions in the SSPL are, by design, very simple. Many times, you can say the same thing multiple ways. For example, in simply adding two numbers, each of the following are acceptable:

```
10 + 10
add 10 and 10
what is the sum of 10 and 10
what is ten plus ten
```

Most variations of these—e.g. "what is", "the" and "and" are all optionally supplied, but are used for disambiguation when provided. The style of the expression is often left to the author and the compiler accepts the supplied form. Furthermore, the SSPL can adapt to a user's style by allowing alias substitutions, word liaisons and informal procedure creation on the fly during edits.

The SSPL as a language is almost completely devoid of syntax. The only syntax that exists are block delimiters, which simply say, "everything inside this region should be treated as a single unit from the outside". Example:

```
what is (10 + 10) + 2
  Or
the sum of [1 2 3 4 5]
```

In the SSPL, there is only one kind of logical block delimiter. Braces, brackets and ellipses ([ ] { } ( )) are all equivalent to represent one. Also, in the SSPL, there is a shared common context regarding the use of demonstrative pronouns such as this and that. For instance, here is an exchange with the SPPL that compiles and runs as a standalone function—it is the collar-estimate that can be performed on a building (a floor is currently selected):

```
what is the area of the given floor, in square feet
now, multiply that number by the count of the
model levels minus one
Ok, divide that numeric result by 1600
now, return 2 times that number
```

At each step, the SSPL keeps track of the previous statement, allowing the user to write in a more natural form, if desired (note—there is no runtime penalty for this; determiner references are resolved on the stack at compile-time). The following is also equivalent:

```
return
   2 times the floor area, in square feet note:
   "in square feet" is a
converter
   times the project story count
   divided by 1600,
   as integer
```

Or simpler still:

```
return
   2 * floor area, to sqft
   * project story count
   / 1600
```

All these forms are functionally equivalent. You're free to decide how you want to express your logic. In addition to pre-defined procedures, the SSPL may also be used in an interactive, conversational way with queries and statements yielding immediate answers, and again with a sense of a shared, subjective context, allowing statements such as "move those up by 5 feet".

Because the SSPL can define the same formal function definitions that traditional programming languages can, it is possible to create a pre-compiled library of rules, which can be invoked directly or indirectly to facilitate some action or validation. In other words, a rule library and editor may be used to define and test the SSPL rules created for use in a design environment. Rules allow engineers and advanced users to customize queries, reports and translations to and from design data, much the way they would traditionally use tools such as a spreadsheet. Rules defined in the rule library in the SSPL have the benefit of human readability, direct access to model data and execution speed; rules and statements defined in the SSPL are always and immediately compiled to machine code to run at full speed.

For example, a library may be loaded with a set of the SSPL rules specifically defined to perform a conversion from a central model to a computer aided design (CAD) format (e.g., the AUTOCAD DWG format). The user may add, remove, edit and execute any rules defined in the loaded library, and is free to define any other sets of rules. The following code illustrates such rules converting to a CAD format:

```
note: create a DWG helper
define a dwg noun variable named "drawing",
  set to new dwg
note: instantiate a default DWG
initialize the drawing
set the drawing db Line WeightDisplay to true
define an arraylist variable named "group list",
  set to generate groups for the model
note: generate the geometry . . .
generate gridlines for the drawing and the model
generate floors for the drawing model group list
generate rooms for the drawing and model with group list
generate beams for the drawing and the model with group list
generate columns for the drawing and model with group list
generate slabs for the drawing and model with group list
note: Create the groups for the levels
iterate with "listindex"
  from 0
  to the count of the model levels
  {
    define an arraylist variable named "idlist"
    set idlist to grouplist at listindex as arraylist
    define an objectid variable named groupid, set to the
drawing creategroup "level" + listindex tostring
    idlist
```

Further to the above, when logical instructions can be defined with a minimum of formality and syntax, the user is more at liberty to express them in a natural, conversational style. Embodiments of the invention may utilize a central model application that exposes a conduit for direct, interactive commands (e.g., voice commands). Commands executed in this command line have full access to the loaded building model and are immediately executed with results returned as either direct values or highlighted model selections. Here is an example of an interactive exchange, facilitated by a voice command (note: both the user and the computer are selecting model objects during the exchange, shown in brackets < . . . >):

```
how many columns are there whose connection type is pinned and
whose level equals the current level index
Response: 17
select any columns whose connection type is pinned
Response: Ok < 102 pinned columns are highlighted >
how many of those are there please
Response: 102
what is the length of the second of the selected column
Response: 4.121
< user selects a model floor >
Ok, select any columns that are inside this
Response: Ok < 64 columns are highlighted >
< user selects a model room >
select any columns that are inside this
Response: Ok < several columns are highlighted >
move those down by 3.2 feet
Response: Ok < the selected columns, and their connected beams
are moved >
what is the maximum, for current level rooms, of each area
Response: 51.849
select any current level rooms whose area is nearly equal to that
Response: OK < the largest room on the current level is highlighted
>
```

With introspection in the SSPL, it is possible to define formal procedures in an informal way. For example, users may store values or selections as variables, so they may be recalled by name during subsequent interactions. Example.

```
what is the length of the second of the selected columns geometry
Response: 4.1
please store that as "second length"
Response: Ok
multiply second length by 2
Response: 8.2
```

Embodiments of the invention may also make it possible to store statements as stored procedure/variables, allowing whole statements to be recalled and re-evaluated by name. Statements such as these may, in turn, contain other statements and variables. In this way, the user can define whole sets of procedures that may be used the same way the formal rule library is used yet avoids the step of defining them distinctly. In addition, the author/user has the benefit of immediately testing and validating them.

The following is an example of such a procedure, re-applying the example given above; embodiments of the invention provide a back-of-the-envelope procedure when roughly estimating the number of collars that might be required for a given building to consider bidding on. The procedure is:

```
The square footage area of the building, times 2,
divided by the weight of the chosen collar in pounds.
```

To determine the square footage of the building, the floor area is multiplied by the number of floors in the building. The model unit is meters, so it is converted to feet. The weight of the chosen collar is 1600 pounds. The term "2" above is selected as a magic number (it can range between approximately 1 and 3). An interaction might look like this:

```
what is the model levels count, minus one
Response: 6
store that as "floor-count"
```

Note that while the value is stored and is useful, it may be more useful to store it as a statement, so that it can be re-used:

```
what is the model levels count, minus one
Response: 6
store the last command as "floor-count"
```

Now, recalling "floor-count" will re-issue the statement rather than the value "6".

```
store 2 as "psf"
Response: Ok
store 1600.0 as "weight
Response: Ok
< User selects the floor object >
```

Here is the top-level statement, which calculates the estimate:

```
what is the area of the selected floor in square feet,
  times psf,
  times floor-count,
  divided by weight,
  as an integer
```

-continued

```
Response: 287
< Note: this is the correct value for this building >
store the last command as "collar-estimate"
Response: Ok
collar-estimate < Note: Now we can use it like a command >
Response: 287
store "6 / 3" as "psf" < Note: change our variables yet again >
Response: Ok
collar-estimate
Response: 215
```

In view of the above, there is now a fully-fledged function named "collar-estimate", which can perform this back-of-the-envelope calculation on any building loaded into a central model application, even though the function has not been formally defined; embodiments merely asked the system to save commands under friendly names.

Functional Overview

Embodiments of the invention follow the presumption that the underlying meaning in any well-formed sentence can be broken down into functional components that can be executed by a machine. Furthermore, the components of the sentence itself may be broken down into functional components that may be directly or indirectly executed by the machine. The only distinction that the SSPL makes about direct or indirect execution is: the SSPL executes everything it possibly can immediately and emits instructions for the machine to execute the rest at an indeterminate time. The criteria for determining this distinction is whether or not the functional components may be evaluated to yield a concrete (non-variable) value.

For example, the article "the" can be treated as functional if one considers that it accepts an argument of a noun or qualified noun (via adjectives, etc.) and projects that noun back such that other functions can consume it. To illustrate, the statement "Open the last file", where the "last file" is an argument to the functional notion "the", and "the last file" is, in turn, an argument to the "Open" function. In this case, "Open" might be the only operation that will be ultimately presented to the machine for strict execution, but a functional breakdown of the subject of the statement ("the last file") was still made during "interpretation time". In the SSPL, the execution model for interpretation-time and strict execution is unified in a single concatenative, stack-based system, which is a similar model to that used in platforms such as .NET, JAVA, and WEB ASSEMBLY. For convenience, embodiments of the invention may emit instructions into the .NET/CORE framework.

A SSPL code segment can look as verbose as (the Fibonacci recursive function) in Table A:

TABLE A

```
define a public static prefix or postfix integer function named fib
  accepts a mandatory integer parameter named n
{
  when n is greater than one then
    return the sum of fib n minus one and fib n minus two
  otherwise
    when n is equal to one then
      return one
    otherwise
      return zero
}
```

Alternatively, a SSPL code segment can be as succinct as this equivalent definition illustrated in Table B (both are legal):

TABLE B

```
def int fib
  -> int n {
  n > 1?
    fib n - 1 + fib n -2
  :
    if n == 1 1 else 0
}
```

The SSPL has so few requirements for symbols that it can also be used in places where natural language commands are useful (see Table C which illustrates a select statement issued in a computer-aided design application):

TABLE C

```
select each line in the model
  whose length is greater than 2 times the average of each length in them
```

The following sections describe a high-level view of the SSPL.

Plain Text

The SSPL uses plain text for statements and expressions. There are a minimum of special characters, limited only to those used to delimit explicit blocks, described below.

Case Sensitivity

The SSPL is case insensitive. There is no distinction between words in upper vs lower case, except when found within a quoted string.

Table D illustrates such case insensitivity:

TABLE D

```
THIS equals this
"THIS" doesn't equal "this"
```

Basic Semantic Units

In the SSPL, the basic lexical unit is the word. Words are groups of plain text characters, delimited by the whitespace characters, space, tab and newline Words may be comprised of plain text symbols. Table E illustrates an example of such basic semantic units (source shown in italics):

TABLE E

```
This sentence has 7 words including $#%_^#$?.:
```

Note that the SSPL defines very few keywords in the traditional programming language sense (the only exceptions being break, continue and return). All parts of the language are comprised of words and functions, and each of them are defined using the same procedure available to developers.

Multi-Word Words

The SSPL supports the declaration of single notions comprised of multiple words. All declarations support naming using one or more space-delimited words. For example, "coffee mug" can be defined as a single notional unit in the SSPL.

Punctuation Marks

The punctuation marks are all treated as regular characters except comma, which may be ignored, and quotation marks, which are used to enclose string literals.

Note: Textual affinity (the distance two words are apart in spaces) may be considered for expression evaluation. The comma may contribute to spacing.

SSPL is Statically Typed

All word (notional) values are expressed in terms that are known at compile time. For example, Table F illustrates such word expression values and types:

TABLE F

| Word Expression Value | Type |
|---|---|
| 10 | Integer |
| 12.2 | Floating point |
| "abc" | String |
| True | Boolean |

The SSPL may use the .NET type system for notional, runtime type representation.

Code Comments

Code comments allow a developer to add additional text that the compiler will ignore. Code on any line following a comment initiation word will be ignored for the remainder of the line. Comment initiation symbols are:

| |
|---|
| // |
| note: |
| todo: |
| ** |
| end note |

Table G illustrates exemplary code comments.

TABLE G

| |
|---|
| 10 * 10 // this is a comment, but 10 * 10 is not |
| 12 * 12 note: this is a comment, but 12 * 12 is not |

Parts-of-Speech Typing

In addition to the statically typed values words represent, words in the SSPL can express parts-of-speech types.

Parts-of-speech (POS) expression types help shape how the words may appear together in a statement and help optimize the compilation process. They are optional and only used for disambiguation at compile-time and do not interfere with the expressivity of a word in the notional, runtime expression space.

The POS types are the basic grammatical types we're familiar with (the SSPL POS types may be limited to English), including noun, adjective, determiner, conjunction, verb and preposition.

Words may therefore have two separate type designations; a traditional "notional" type and a POS type as illustrated in Table H:

TABLE H

| Word Expression Value | Type and POS Type |
|---|---|
| 10 | Integer and noun |
| Car | Object and noun |
| Yellow | Color and adjective |
| Coffee mug | Object and noun |

Noun Vs Noun Phrase

The distinction between a noun and a noun phrase will become important as the discussion starts to encounter the dichotomy faced when words express types in two different spaces. In summary:

- A noun represents a type-name; a category or reference to a thing.
- A noun phrase represents a value. An actual, literal, demonstrated or determined value.
- Only regular nouns can be determined with determiners ("a", "an", "the", etc.)
- Determiners transform regular nouns into noun phrases
- Proper nouns are noun phrases
  - e.g., variable names Object Orientation The SSPL is object oriented. Objects are defined that have properties and methods that are applicable to them and to any instance of its type and may be defined as specializations of a parent definition.

Types participate in an ontological hierarchy, where object values embody ancestral types. Table I illustrates an exemplary ontology (POS Types are included on the right, separate from the notional ontology):

TABLE I

| Value | | Type | | Parent Base | | Grand Parent Base | | POS |
|---|---|---|---|---|---|---|---|---|
| 10 | —> | Integer | —> | Value type | —> | Object | \| | Noun |
| Car | —> | Vehicle | —> | Object | | | \| | Noun |
| Yellow | —> | Color | | | | | \| | Adjective |
| Yellow | —> | Color | —> | Object | | | \| | Noun |
| "abc" | —> | String | —> | Object | | | \| | Noun |

"->" references a parent category name; an "isa" relationship.
All objects ultimately refer to the Object base type.

Stack Based, Concatenative Evaluation

The SSPL is a stack-based, concatenative programming language, evaluating its values on a LIFO (last in, first out) stack.

Each word has an independent expression (value) that is pushed onto the evaluation stack in the order they are encountered in source.

- No word, of any kind, may ever express more than a single value.
- a collection of values is considered a single value—see below.

When a word evaluates a value, it is "pushed" on the stack and is available to contribute to aggregations, along with any other stack items. Table J illustrates an exemplary given input for 10 20 30 and a corresponding evaluation stack.

TABLE J

| Source Input | Evaluation Stack | |
|---|---|---|
| 10 | 10 | 10 is pushed |
| 20 | 10 20 | 20 is pushed on top of existing 10 |
| 30 | 10 20 20 | 30 is pushed onto those. |
| | | Stack height = 3 |

In Table J, the data stack grows (shown from left to right) as items are pushed onto it.

Aggregations: Explicit, Implicit and Functional

There are three basic forms of aggregation in the SSPL: explicit, implicit and functional. These aggregations form the backbone of the SSPL definitions.

Explicit Aggregation

An explicit aggregation, also called a "block", defines an explicit encapsulation of words.

a) Blocks are formed as a delimited group of words (including other block words) of any size b) Blocks are formed inside block delimiters { }, [ ] or ( )

c) All three forms of delimiter pairs are equivalent; each define the same kind of block d) Blocks enclose scope boundaries for naming. Words defined within a block remain local to it e) A block is also a word, as seen from the outside f) Since blocks are also words, they may also express a single value.

The following provides an exemplary explicit aggregation in accordance with one or more embodiments of the invention.

| | |
|---|---|
| {10 20 30} | 3 words; expressed outside as a single integer collection |
| [10 + 10] | 3 words; a single expression evaluating outside to the integer 20 |
| ("mark" "twain") | 2 words; expressed outside as a single string collection |

Blocks can hold expressions too:

| | |
|---|---|
| 10 + {10 + 12} | 32 |
| the third of {10 20 30} | 30 |

Implicit Aggregation

An implicit aggregation is formed when two or more adjacent words are understood to act together as a unit.

a) "square root", and "floating point" are examples of aggregates formed by two literal words b) Like literal words, aggregate words can express a value c) Even when comprised of multiple participants, an Implicit aggregation is a single word d) Implicit aggregations are sequences of literal words and/or type names.

For example, an adjective, noun (type, type) aggregation is activated for any adjective followed by any noun:

public variable

The above forms an aggregation of an adjective type and a noun type to express as another qualified noun type. The resulting noun may, in turn, participate in another adjective noun pair aggregation or function (e.g., "static [public variable]"). Note: attributive nouns also serve as adjectives (e.g., "integer variable") and are supported with an [attributive noun, noun] pair.

Word aggregations, whether explicit or implicit, are the most basic form of function, when you consider a function to be an expression made in response to a predefined set of input conditions. Table K illustrates an exemplary implicit aggregation in accordance with one or more embodiments of the invention.

TABLE K

| Input | Stack | |
|---|---|---|
| broken | broken | Adjective broken is pushed |
| yellow | broken yellow | Adjective yellow is pushed (no aggregation possible) |
| car | broken yellow car | Noun car is pushed |
| | broken yellow car | Yellow and car are aggregated into a new noun |
| | broken yellow car | Broken and [yellow car] are aggregated |

Note: The noun being qualified must have a compatible object property to be qualified by the applied adjective. For this example, a car is both colorable and breakable. Like any function, aggregations have a prescribed input signature and an optional output expression that replaces the input word values during evaluation. When an aggregation executes, it consumes the source words it is comprised of and (optionally, when it has an expression) expresses its output as a single value in their place. Most implicit aggregations in the SSPL support POS types and generally project one of their arguments back as a return value, maintaining other argument values for interrogation by consumers. For example, the adjective-noun aggregation always reprojects the noun as a return and maintains the adjective for consumers to query.

Explicit Function

The third type of aggregation is the explicit function. An explicit function is an explicit word that consumes one or more adjacent word values, performs a service and optionally expresses an output value of its own. It is the same traditional function used in mathematics and other programming languages.

In contrast to the implicit aggregation, an explicit function is invoked by the presence of a specific literal word, that does not independently express any value. Its only purpose is to aggregate other neighbor words (arguments) to form the valence of input and optionally express an output value. The following is an example of a simple explicit function:

| | |
|---|---|
| 10 x 12 | "x" is an explicit function accepting two arguments. The "x" word by itself does not have an expression, only an action. |

Table L illustrates the stack for the above explicit function.

TABLE L

| Input | Stack | |
|---|---|---|
| 10 | 10 | |
| x | 10 x | |
| 12 | 10 x 12 | |
| | 120 | 10 and 12 are consumed by x and all 3 are replaced by the result |

Function and Argument Orientations: Fixity

Function words relate to their arguments, in one or more of 3 orientations:

Prefix, Infix and Postfix.

Prefix: where the function word precedes its arguments:

```
function argument argument argument ...
add 10 and 2
```

Infix: where the function word is between the first and second argument:

```
argument function argument ...
  10 + 12
```

Postfix: where the function word follows all its arguments:

```
... argument function
  1.2 squared
```

Because there is no explicit convention for the lexical relation between function and argument, evaluation order must be established by the compiler when expressions have ambiguity. Consider the expression:

10+10+5

The process of evaluation is illustrated in Table M:

TABLE M

| | |
|---|---|
| 10 + 10 + 5 | |
| 20 + 5 | 10 + 10 is evaluated and replaced with the result |
| 25 | The second addition uses the results of the first |

Note that the SSPL uses left operator associativity; the default order of operations is from left-to-right (the first + is evaluated before the second +). Because addition is associative, there is no penalty for ambiguity in the above expression: (10+10)+5 is equal to 10+(10+5).

Language Basics

This section outlines the most basic parts of the SSPL.

Equality and Inequality Testing

The word for performing equivalence testing in the SSPL is "==", analogous to is equal to. == is a prefix function, taking two comparable values on either side and always evaluates to a Boolean, true or false value. Example expressions:

| | |
|---|---|
| 10 == 10 | this is true |
| 10 == 12 | this is false |

Note that reference instances are comparable using ==. Two references are == when either they are the same reference (the same memory location), or the first operand's overloaded ==evaluates to true, when receiving the second operand (For example, .NET System.String.op_Equality( ) member);

Inequalities

Like equality, inequalities are infix functions taking comparable values on either side but will not consider memory reference addresses for comparison. For example:

| | |
|---|---|
| 10 > 10 | // this is false |
| 10 >= 10 | // this is true |
| 10 < 12 | // this is true |
| 10 <= 12 | // this is true |

Is

The SSPL linking verb word is can often and optionally be used in place of equality /==, and in places where truth (i.e., a Boolean result) is used. For example:

| | |
|---|---|
| 10 is 10 | // this is true |
| 10 is 12 | // this is false |
| 10 is > 8 | // this is true |
| 10 is < 8 | // this is false |
| 10 is greater than 8 | // this is true |
| 10 is greater than or equal to 12 | // this is false |

Note: the plural form of is, are, is supported for use with plural noun forms.

Is not

The negation "not", may be used to qualify the truth value evaluated with is. For example:

| | |
|---|---|
| 10 is not 10 | // this is false |
| 10 is not 12 | // this is true |
| 10 is not > 8 | // this is false |
| 10 is not < 8 | // this is true |
| 10 is not greater than 8 | // this is false |
| 10 is not greater than or equal to 12 | // this is true |

Predefined Words

Null

The null word represents a null reference, a singleton in .NET that represents nothing. It can be used for comparisons against instances of reference type objects. Example (where x and y are reference types):

```
if x == null
  and y is not null
  then ...
```

Arrays and Collections

Arrays are supported in the SSPL as a fixed, predefined collection of typed objects. For instance:

define an integer array variable named arr=[1 2 3 4 5]

This statement will define a variable of type integer array (an implicit aggregation representing a specialized type) and is initialized using the explicit block [1 2 3 4 5].

Array Element Access

An array element may be accessed with either the at member or an adjective such as "first" (all such adjectives from "first"/"1st" through "tenth"/"10th" are predefined words in the SSPL).

All element accesses are zero indexed. Example (based on the array [1 2 3 4 5]):

```
12 * arr at 1 // result is 24
12 * the third of arr // result is 36
```

Array types are created to support each countable type (i.e., non static) imported or defined in the SSPL.

Collections

The following .NET framework collection types may be supported:

- IEnumerable
- ICollection
- IList
- ArrayList
- ListDictionary
- enumerable T, collection T or list T generics are supported for each countable type imported or defined in the SSPL.

Example instantiating a typed list of integers:

define an integer list variable named abc, set to a new integer list

Collection Covariance

Note that only arrays and enumerable collections are covariant. You can pass a typed array or enumerable collection of a more derived type to an assignment or parameter of less derived type variance. None of the other collection types support this.

Type Coercion—as

Type coercion between supported conversions is facilitated with the as function word. Example converting an integer to a double:

```
10 as double * 2.1 // The 10 literal integer coerced to double prior to the multiplication - result of 211
```

Note that as is a pure function that can perform the coercion immediately at compile time, so long as the argument it takes may be immediately evaluated (i.e., it is constexpr).

Control Flow

If/then Statement

If/then statement is the most basic control flow statement, allowing for basic decisions. Example:

```
If a > 25 then note: condition clause
  b = 12 note: then clause
```

The then clause will be evaluated only when the condition clause evaluates to true.

In one or more embodiments, the stack-effect must be computable at compile-time. In this regard, note that no statement, expression, or block (including if/then) at any point in code may push an unknown number of elements to the stack. Because of this, this form of if/then cannot express value, since it is unknown at compile time whether the condition will pass at runtime.

This requirement affects all control-flow statements in a similar way.

If/then/Else Statement

An extension of the if/then allows a counter clause which evaluates when the condition statement is false. Example:

```
If a > 25 then note: condition clause
  b = 12 note: then clause
else
  b = 55 note: else clause
```

In one or more embodiments, expression variation can be utilized. Specifically, in the above form, because we can guarantee that either the then clause or the else clause will evaluated, we can enforce that the stack effect of both of these clauses is the same, and when this is true, we can allow the if/then/else to have an expression value. This means we can use if/then/else like this (where the "?" word is an infix form of if):

set *b* to *a*>25? then 12 else 55

Because we can guarantee that either clause will evaluate, we can use it to express a value. The compiler need only enforce that both clauses express a single instance of the same type. Note the word "otherwise" is an alias for "else" and can be used in its place:

set *b* to *a*>25? then 12 otherwise 55

Iterate Loops

The iterate word provides a means to iterate over a set of integer values, using a counter. It is analogous to the "for" keyword in C # and C++. Example of its use:

```
define a string variable named alphabet, set to string empty
  iterate with i from 65 to 65 + 26 note: iteration
    initialization: ascii "A" to "Z"
  {
    add ascii at i to alphabet note: body clause
      statement
  }
```

Note that with iterate loops, the body must be a statement and cannot express a net value, the block delimitation may be optional if there is only a single statement following the initialization; and the sub-words with, from and to are optional. E.g., "iterate i 65 65+26" is equivalent.

While Loops

While loops, like if/then, take a condition clause and a body clause. If and while the condition clause evaluates to true, the body clause will evaluate. The while word takes two parameters, a Boolean expression, and a body statement clause. The body clause cannot express a net value to the stack. The following provides an example:

```
define an integer variable named abc, set to zero
while abc is less than ten
  increment abc
```

In the above example, all that happens in the body clause is that "abc" is incremented. The body clause must never express any stack effect values (i.e., the body must be stack neutral). In addition, When the body clause must have more than a single statement, you must enclose the body in an explicit block { . . . }.

Break Keyword

If there is need to prematurely exit an iterate or while loop, the developer can use the break keyword. The break keyword will force an exit to the loop immediately and set the next statement after the body clause. The break keyword must be issued from within the body clause of a loop. An example that will increment abc to 5 only:

```
define an integer variable named abc, set to zero
while abc is less than ten
{
  if abc > 5 then
    break
increment abc
3
```

Continue Keyword

If there is need to prematurely advance the current iteration of a iterate or while loop, the developer can use the continue keyword to force an early advance to the loop. The continue keyword must be issued from within the body clause of a loop. Example that will loop infinitely after abc reaches 5:

```
define an integer variable named abc, set to zero
while abc is less than ten
{
  ifabc > 5 then
    continue
```

-continued

```
increment abc
}
```

In this case, the counter will make it to 6 and never increment . . . but the loop will continue indefinitely.

Return Keyword

The return keyword is used to pre-emptively (A) exit a function; and/or (B) express an explicit value from a function. Example (uses define syntax):

```
define an integer function named foo
{
  return 12 * 2
}
foo * 2
```

Here, the declared function, foo, is defined to return an integer equal to 24. The usage of "foo*2" will resolve to 48. In one or more embodiments, there may be multiple return statements within a single code block, and a return statement must resolve to the same type as the declared function (in the above example, integer).

Collection Enumeration

There is support for enumeration over items in a given .NET collection.

for each

A for each enumeration will simply iterate over each item found within a contributing collection, executing a body clause with each element found. Example:

```
define an integer array named arr = [ 1 2 3 4 5 ]
for each item in arr
  debug writeline item toString
```

Note: the above code will write out each element in arr to the debug console.

Collection Query Expressions

Collection query expressions are used to extract truth conditions inside a collection. For example, an any collection will evaluate to true when any item in the list evaluates to true inside the condition clause. Some examples:

```
any in [ 1 2 3 4 5 ] > 3
any integer i in [ 1 2 3 4 5] not greater than 3
any integer i in arr greater than 2
any item in arr whose name is not "fred" note: when item
  has a property "name"
any in [ 1 2 3 4 5] where each * 2 > 3
```

Note that each is an index into a single element that will be used as an iteration variable name. "it" is also acceptable.

Like any, all will evaluate to true when all items in the list evaluate to true inside the condition clause: Some examples:

```
all in [ 1 2 3 4 5] > 3
all integers i in [ 1 2 3 4 5] are not greater than 3
all integers i in arr are greater than 2
all in [ 1 2 3 4 5] where each * 2 is greater than 3
```

Note that each is an index into a single element that will be used as an iteration variable name. "it" is also acceptable.

Collection Narrowing Expression—Each

The each narrowing expression is used to constrain an existing collection based upon a condition clause and express a new, narrowed expression its result. Some examples:

```
the count of each item in [ 1 2 3 4 5] that is greater than 3
add each integer i in arr that is not 7 to otherarray note: where
  "otherarray" is an integer array
find each item in [ 1 2 3 4 5] where it * 2 is > 3
```

Optimized Expression Evaluation

Because the SSPL defines no syntax or single convention for specifying the lexical relationship between function and argument, and because there are multiple aggregate forms to consider, there are many cases that must be disambiguated to correctly infer the intended evaluation of an input expression.

In the SSPL, each aggregation that could possibly participate in the organization of a statement will compete with all others for the right to represent their constituent words.

The following sections cover the steps used.

Competitive Optimization

Function words must compete for the consumption of their arguments when there is ambiguity. For example:

10+12×2

Here, the term "12" is shared by two competing functions, "+" and "x". To determine the order of operations, an assignment optimization is run on every input statement to ensure that any such competing functions or subfunctions in the source result in the highest possible score at any given node position for a legal participation of each word.

Precedence Weight

Each function definition (and orientation) includes an inherent numeric precedence weight to represent priority when competing with neighboring functions for access to local arguments. This weight is initially fixed but is mutable as use patterns dictate.

The optimization routine exhaustively arranges the functions and arguments into every legal configuration and scores them using these precedence weights to arrive at a score. The highest scoring configurations win the right to represent their constituent words in the resulting, disambiguated sentence.

For example:

10+12×2

The node weights for each node are: 10, w=1; +, w=1.1; 12, w=1; x, w=1.2; and 2, w=1. Again, we see that the term "12" is shared by two competitors. However, the sub-expression 10+12 has a combined (summed weights in a signature) weight of 3.1 (i.e., 1+1.1+1) whereas 12×2 has a weight of 3.2 (i.e., 1+1.2+1).

| | | |
|---|---|---|
| 10 + 12 | × | 2 |
| w = 3.1 | w = 1 | w = 1. |

The default interpretation yields a losing orientation

Without a precedence weight, the first sub-expression 10+12 would be evaluated before 12×2, violating a standard mathematical convention. By imbuing the "x" function with slightly more weight than the "+" function, it is allowed to be evaluated first, as though it were interpreted as:

| | | |
|---|---|---|
| 10<br>w = 1 | +<br>w = 1.1 | 12 × 2<br>w = 3.2 |

because 12 is scored 3.2 via "×", it was used over "+"'s 3.1. The result is (10)(+)(24)=(34) which beats out the alternative assignment iteration: (10+12)(×)(2)=(22)(×)(2)=(44).

A node's participation as an argument to any competing function is determined by finding the function with the highest score that takes the given node as an argument. For instance, for the "12" and "2" terms in the function "×", the score reached 3.2 and so won the right to accept 12 and 2 as arguments first. Note: The prefix orientation of a function is given very slight precedence over infix and/or postfix orientations of the same function, to afford default left-to-right order of operations. Further Note: As described above, the SSPL can use explicit blocks to manually disambiguate such expressions. The following is perfectly legal:

10+(12×2)

Precedence Example in Pythagoras' Theorem of Right Triangles

We can demonstrate a more complicated disambiguation problem by considering the theorem of right triangles, which says the hypotenuse, c, of right triangle (a, b, c) is equal to:

$$\sqrt{a^2+b^2}$$

In this one expression, we can see all three forms of fixity: prefix $\sqrt{x}$, infix + and postfix $a^2$. In the SSPL, here is how we could write it in a reasonably natural way:

the square root of a squared plus b squared

From this expression, written out the way we commonly speak the above equation, there are seven distinct, legal interpretations, which without mitigation, would have equivalent scores. Table N illustrates these interpretations:

TABLE N

| |
|---|
| (square root (a squared)) + (b squared) |
| (square root (a squared) + b) squared |
| ((square root a) squared + b) squared |
| ((square root a) sq) + (b squared) |
| square root (((a squared) + b) squared) |
| ((square root (a squared)) + b) squared |
| square root ((a squared) + (b squared)) |

Because of the additional weight added for relative precedence, the last entry in this list is correctly chosen by the compiler. Where precedence value is established as:

squared>+>square root

Affinity Weight

In addition to precedence values imbued in functions by conventional order of operations, the SSPL can infer additional precedence from the proximity that terms have to each other. The closer two terms are to each other, the heavier the affinity weight they are given relative to distal terms, allowing for a more natural form for expression. For example, the expression:

10+12*2 would yield the value 34 as discussed above, based on the standard rules of operator precedence. If we add and consider some extra space between the terms, then the precedence can be altered:

10+12*2 will yield 44 because 12*2 is inferred last from insufficient proximity. Similarly, we can use the comma to imply affinity breaks, just as we do in written text:

10+12,*2 which again yields 44. Note that a comma defaults to the width of a TAB (nominally 5 spaces).

Essentially, the SSPL defines affinity as a measure of spaces, and it computes an average space per character for a given expression. For an expression whose average spaces are larger than another in contention for precedence order, the sparse expression precedence is lessened by the ratio of their respective average spaces.

While standard precedence varies slightly around 1.0, depending on the traditional order or operations, the value given to a single space above and beyond these is fixed at 1.5. The use of spaces to specify precedence order is, of course, optional and left to the developer to choose, and verify.

Symmetry Weight

There are cases when simple or affinity precedence is not enough to disambiguate more complex statements, where idiomatic or traditional patterns are common. For example, this statement from the common Fibonacci function (The Fibonacci function accepts and returns a single integer and is defined as prefix only):

| | | | | | | | | | |
|---|---|---|---|---|---|---|---|---|---|
| fibonacci | n | – | 1 | + | fibonacci | n | – | 2 |

Because + and – have equivalent precedence, it would not be possible to correctly disambiguate this expression into the traditional evaluation order:

Fibonacci($n$–1)+Fibonacci($n$–2).

To solve these cases, the SSPL adds additional weight to any sub-expressions that are repeated within a given signature. In the above example, the subexpression "Fibonacci n–N" is repeated in the sequence (though the numeric arguments are different), and so both are bumped in score leading to the correct interpretation.

There are approximately 45 different legal configurations of the above statement that are considered as alternatives to the correct solution and precedence weight alone cannot yield a single objectively correct permutation because of equivalence between + and – weights. However, this simple symmetry bump is useful to disambiguate many more complex mathematical statements, as well as in more natural expressions.

FIG. 1 illustrates an SSLP Editor showing a variable declaration 102 and a Fibonacci expression code snippet 104, along with a depiction of the disambiguated "Build Graph" interpretation 108 in accordance with one or more embodiments of the invention. Note: the symmetry bump feature is merely an aid for disambiguation when the ambiguity is high. Explicit parenthetical blocks are supported to handle cases when ambiguity yields an incorrect interpretation, just as might be required in natural (written) language.

Optimization Procedure

For any complex statement in the SSPL, the procedure for disambiguation is the same, after applying precedence and symmetry weights:

(A) Find the viable* word or aggregate with the highest overall score (as described above). This step may include placing the winner in the winner list, maintaining relative order.

(B) Find the remaining viable word or aggregate with the highest score that does not overlap any aggregates already placed in the winner list. This step may include placing it in the winners list, and maintaining relative order.

(C) Repeat (A) and (B) until all viable words and aggregates are placed.

Note: A viable word or aggregate is one that can stand alone. For example, "equals" cannot stand alone because it requires two arguments, and they are not filled.

Defining Words, Aggregations and Functions

Variables, implicit aggregations, and functions are defined in the SSPL using the define function (yes, define is a function!).

Variable Words—Using the Define Function

Variables are custom storage locations accessible by name that hold values to be used in a procedure. Variables can be short-lived or long-lived depending on the context in which they are defined.

Variables are declared with the first overload of define. An example variable declaration statement is:

define a public static read write integer variable named abc=23

An exemplary usage of the variable is:

*abc**2+2

Notes: The define function only takes a single argument here, the variable object. The variable object is parameterized on the left with adjectives. Exemplary adjectives are:

(1) public, static, read write are all adjectives that qualify variable (a) read write is another example of an implicit aggregate (2) integer is an attributive noun that is treated like an adjective for variable (3) named is an infix function accepting a variable and a name, as a past participle verb define accepts the parameterized variable and creates a memory location for it accessible by its name, "abc". In addition, "=" is an infix function that accepts the parameterized define statement itself and a value that is assignment compatible with the variable type. Assignment may not occur until initialization time unless the supplied value is constant.

The variable object can be parameterized with the following:

- ii) name
  - (1) String identifier name, or unresolved name when allowed
- iii) type
  - (1) Type
- iv) parts of speech
  - (1) Parts of speech type
- v) Accessibility
  - (1) public, private
- vi) Scope
  - (1) local, instance, static
- vii) Access
  - (1) read only, write only, read write A variable's scope space (the region it may be referred to by its unqualified name) is limited to the enclosing block's scope (function block or any sort of aggregation) and any scopes defined as children of the enclosing scope.

A variable name may not be repeated within the same scope, or any parent scopes. Note: these rules adhere generally to the scope resolution rules in C #.NET.

Function Words—More with Define

A function is declared with define as well:

```
    define a public static proper noun prefix
    or postfix integer function
  named twelve
    {
      return 12
    }
```

The define function takes a single argument, the function object. In addition, like the variable, the function object is parameterized with adjectives and past participles. Further, the function object shown is parameterized with the POS Type proper noun. In addition, the function object shown is parameterized with the orientations, prefix and postfix. The example above demonstrates a return statement. In this example, the "return" is optional. Because the code block is simply an explicit block {12} is equivalent to {return 12}. Thus, return is a control flow statement, not an evaluation word The function object can be parameterized with the following:

- i) name
  - (1) Identifier name
- ii) type
  - (1) Type
- iii) parts of speech
  - (1) Parts of speech type
- iv) Accessibility
  - (1) public, private
- v) Scope
  - (1) local, instance, static
- vi) Supported Orientations
  - (1) prefix, infix, postfix
- vii) Purity
  - (1) pure, impure Function Parameter Declaration A function may be further parameterized to accept arguments with a parameter object, which indicates how the function can accept parameters when used:

```
    define a public static proper noun prefix or
    postfix integer function
  named half
      accepts a mandatory integer parameter named x
    {
      return x / 2
    }
```

The accepts function takes the parameter object and the parent function object as arguments, reprojecting the function back for define. Further, parameters are derived from variables, and share many of the same properties The parameter object can be parameterized with the following:

- i) name
  - (1) Identifier name
- ii) type
  - (1) Type
- iii) parts of speech
  - (1) Parts of speech type iv) pass by
   (1) value
      (a) a copy of the argument
   (2) shared
      (a) a reference to the argument
   (3) output
      (a) a reference, instantiated in the body of the function
v) parameter value range
   (1) typerange
      (a) any value that the parameter type can represent
   (2) verbatim
      (a) parameter word must match the name of the defined parameter
vi) inclusion
   (1) mandatory
      (a) Parameter is required for the function to be considered
   (2) optional
      (a) Parameter is not required—default value will be used in absence.
vii) arity
   (1) single
      (a) Argument for this parameter may appear only once in the caller
   (2) multiple
      (a) Argument for this parameter may appear multiple times
viii) allow unresolved name
   (1) true/false
      (a) Indicates that the parameter can accept an unquoted string
      (b) To support multi-word identifiers, use quoted strings
ix) default
   (1) An object value, assignment compatible with the type of this parameter
   (2) Used with the optional flag. In the absence of an argument, this default value is set.

Named Parameters

A name may be required and may have true/false values. The value true/false indicates that the argument for this parameter must be named. E.g., using "half" example above:

```
half x of 22
```

Function Scope

The scope rules for functions are the same as for variables, except function names may be overloaded. For example, two functions with the same name may be defined within a given scope so long as the signature of each such function is unique. The following declarations are legal in the same scope:

```
define a function named half
   accepts an integer parameter named x
define a function named half
   accepts an double parameter named x
```

Implicit Aggregation Words

Implicit Aggregations can be defined with the define function using the same procedure as used with functions, except:

Implicit aggregations do not have names
Implicit aggregations are always prefix oriented
An example of an [adjective, noun] aggregate declaration:

```
define a noun object aggregation
     accepts an adjective object parameter
     accepts a noun object parameter named n
  {
  return n
}
```

Implicit aggregations do not suffer from name clashes, but two aggregations with the same signature in the same scope is illegal.

Parts of Speech Participation in Evaluation

In the SSPL, all the major parts of speech are defined as types that may be used to identify how words may be joined in expressions, making it more understandable for readers and more efficient for compilation. Many words in the SSPL are predefined with POS types.

Parts of Speech Case Study

The next section introduces a use-case scenario for parts of speech evaluation, where a more natural-language expression form is desired. Again, participation of POS types is optional in most of the SSPL.

In a case where the developer would like to express the result of adding two integers, typical languages allow:

```
10+12
```

This expression returns a single integer response. We could hypothetically use it in an assignment statement like:

```
set x to 10+12
```

The drawback here is that we're forced to use mathematical notation each time we refer to the value and doesn't feel very natural.

We could create a new function called "add", which can be defined to run prefix and use it instead:

```
set x to add 10 and 12
```

However, such a function feels even less natural, since although "add" will return an integer, it is a verb in natural language. An alternative is to rename our "add" function to "sum", which can be defined in exactly the same way:

```
set x to sum 10 and 12
```

This gets closer but is still not natural, since "sum" in English is a regular noun, even though it returns an integer in this case. The SSPL allows the developer to tag the "sum" function and the parameters it accepts with parts of speech types that can help the compiler understand what the developer means when expressing procedure in natural language forms.

```
define a public static noun integer function named sum
   accepts a noun phrase integer parameter named a
   accepts an optional verbatim conjunction parameter named
   and
   accepts a noun phrase integer named b
{
   return a + b
}
```

Because we've indicated that the function returns a regular noun, we can use it in a determiner phrase. Similarly, because we've indicated that the arguments are noun phrase, we can use them in a prepositional phrase, like:

set $x$ to the sum of 10 and 12

Embodiments of the invention may also provide for a stack-based evaluation of POS types. In this regard, a determiner phrase is an implicit aggregation taking [determiner, regular noun] pairs and returns a noun phrase form of the noun. It may be noted that the same stack-based evaluation procedure used on the notional/traditional type values is used during compilation to resolve parts of speech types affixed to our word values. Consider:

| Input | Stack | |
|---|---|---|
| the | the | definite article determiner proposal is pushed |
| sum | the sum | noun integer function proposal pushed |
| of | the sum of | preposition proposal is pushed |
| 10 | the sum of 10 | literal noun (NP) is pushed |

Further to the above, embodiments of the invention may also provide a POS proposal as an alternative interpretation that is included for competition. At this point, the prepositional phrase input conditions are met, and it can collapse into a noun phrase proposal. Note that this only a new interpretation of the input, "of 10", which still fits into the sum signature. It does not preclude "of" being interpreted another way—all other interpretations will still compete as described above. Some interesting interpretations include:

| | |
|---|---|
| | the sum [of 10] |
| and | the sum [of 10] and conjunction "and" is pushed |
| 12 | the sum and [of 10] and 12 literal noun is pushed |

Here, the input conditions of the sum function are met and can be evaluated. Again, the compiler is pushing only the proposal.

| |
|---|
| the [sum [of 10] and 12 |

Finally, the input conditions of the determiner "the" (determiner and noun) are met and can be considered for proposal.

| |
|---|
| [the [sum [of 10] and 12] |

So, the proposal "the sum of 10 and 12" is scored by the compiler and, since it all conforms to the POS and runtime type constraints defined in the aggregations and functions defined, it is the overwhelming winner, beating out all other considerations. The resulting generated code reflects the winning form.

Define Function Case Study

Several common parts of speech participate as implicit aggregations rather than explicit functions. An example of an implicit aggregation was given above in variations of the define statement. An example of the define statement as used above:

define an infix integer function named power

We can break down the above statement into the parts of speech: verb (VB), determiner (DT), adjective (JJ) noun (NN) and proper noun (NNP) and demonstrate aggregation of a fully functional natural statement using the aggregation techniques described above:

define an infix integer function named power A simple function declaration statement VB DT JJ NN/JJ NN VB NNP The POS designations for each word This statement can be evaluated by breaking it down as described in the following sections.

Attributive Noun-Noun Aggregation

In English, nouns can serve as adjectives when placed immediately before another noun. For instance, integer is a noun that serves as an adjective when qualifying a function. An [attributive noun, noun] aggregation is defined to support these relations and reproject the trailing noun:

Integer function

Note that because there is no aggregation linking attributive nouns to adjectives, an attributive noun must be the closest modifier its subject. This is exactly the case in English grammar. An illustrative example that fails:

an apartment blue building

Adjective-Noun Aggregation

An adjective noun aggregation is defined to pair an adjective and a noun to reproject a qualified noun. This way, we can chain multiple adjectives.

infix integer function

The adjective noun qualification is defined as an implicit aggregation this way:

```
define a noun object aggregation
  accepts an adjective object parameter
  accepts a noun object parameter named n
{
  return n
}
```

It may be noted that the adjective parameter is not lost here; any consumer of the aggregation can query it to find any subordinate parameter. The define function does this to populate variable and function declarations.

Named Function

For naming a declaration, the named word is defined as an explicit infix function to allows this. Named accepts a qualified nameable object (the SSPL function object is nameable) along with a literal name word and reprojects the function object. The function adds the name property to the function object and returns the qualified function, still projected as a regular noun. A triple-qualified function noun phrase:

infix integer function named power

Determiner

The indefinite article determiner is used to convert the noun region into a noun phrase. The indefinite form lets the define function know that we're instantiating a new instance rather than referring to an existing one. Example:

an infix integer function

The code generates a function object expressed as a noun phrase.

Define Function

Finally, define is another explicit prefix function that accepts a qualified function noun phrase. Define is the word that performs the action of adding the newly defined function to the SS word dictionary. An example of the fully defined executable declaration statement described above:

define an infix integer function named power

Using the simple aggregation forms described above and a POS extension of the traditional type system, we can fully process natural forms of expression in a functional way.

Complex Variable Declaration Example

A separate example of a complex variable declaration:

```
define a public static proper noun read write
double variable named
abc = 2.2
```

Figure 2:
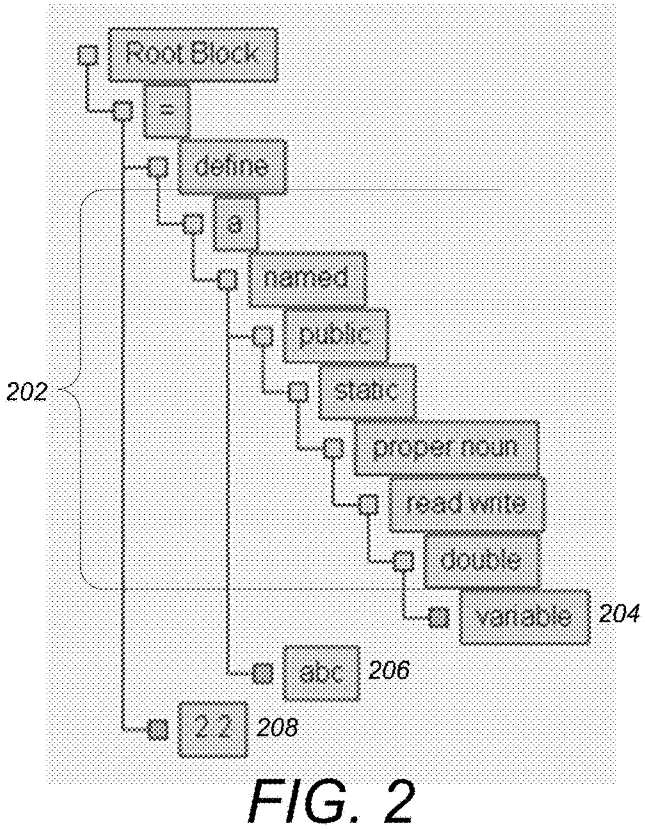
FIG. 2 illustrates a build graph of a complex variable declaration in accordance with one or more embodiments of the invention.

FIG. 2 illustrates a build graph of a complex variable declaration in accordance with one or more embodiments of the invention. As illustrated, FIG. 2 depicts how parts of speech are functionally composed into properties 202 of a variable object 204 before it is instantiated 206 and initialized 208.

Code Compilation and Meta Compilation

Because the declaration words (e.g. define) in the SSPL is designed for evaluation on the same logical stack, using the same runtime procedure as program procedure, there is an opportunity to simultaneously simplify the compilation process and allow extensibility that would otherwise be difficult to implement.

Single Pass Compilation

Typical modern compilers (that do not use header files) process code in grossly two passes; one pass to process any identifier names (variables, functions, types) that are found, and the second pass to use them and compile the code logic.

The SSPL executes all words (e.g., POS words and declaration words) during compiling in an iterative, recursive procedure that allows the compiler to essentially act as an iterative single pass compiler. That is, there is no dedicated declaration pass, and so declarations may happen over multiple iterations, allowing for support of higher order definitions.

Function Purity and Compile Time Execution

Modern compilers and most modern incarnations of popular languages (C++ 20, for example) allow the developer to mark code that lets the compiler know whether the compiler can execute the code during compile process.

For example, given the code:

```
10*2+3
```

In this example, all the information that is required to obtain the result of this expression are given in source code—the correct answer will be produced regardless of whether the compiler emits code to evaluate this expression, or whether the compiler does so immediately, and emits the value 23 in its place.

In more complex examples, when the expression includes a function call (ignoring for a moment the fact that + and * are functions), it might be useful to know whether the function call will yield a consistent result regardless of whether it is called immediately or at runtime, and not modify any external state, it might be useful to emit the consistent result.

```
10+foo
```

If we mark a given function with an attribute indicating that the net effect of the function call is indeed consistent then we can use this flag along with rules governing how this property propagates through words and aggregation expressions to consistently determine whether a given expression or statement can be evaluated immediately.

The SSPL functions include a property called "Purity" which allows this. Pure functions are guaranteed to consistently and cleanly evaluate when given consistent input. Whole expressions that embody such purity are called "constexpr" (to borrow the term from C++ parlance).

Declaration Words in the SSPL are Pure

The define and variable words are marked as pure and typically receive only literal values; values that can be determined immediately. Therefore, define and variable are typically executed during compile by design for declaration words. The pseudocode definition for the variable word looks like this:

```
define a public static pure variabledef function named variable
  accepts a mandatory string parameter named "name"
  accepts a mandatory type parameter named "type"
  accepts an optional type parameter named "parts of speech"
  accepts an optional accessibility parameter named
"accessibility"
  accepts an optional scope parameter named "scope"
  accepts an optional access parameter named "access"
{
  . . .
}
```

Because the function is marked pure and because it receives parameters that can readily be evaluated by the given value, the word can be executed immediately; and therefore, participates in the compilation process. The actions of define and variable add words to the dictionary.

When words are added this way, the compiler will recurse back into the source block armed with the new definitions created in the previous round, and successfully compile those words now understood. Of note is that this feature may not be limited to the compiler words; the developer is free to mark aggregations and functions as pure, taking advantage of the feature directly.

Parameterized Function Declaration—Meta compilation

There is an opportunity to expand on the declaration framework by using the above compile process. Because every part of the declaration process (the process for creating new variables and aggregations) is defined by a function that executes in the same way ordinary functions do, we can extend the language in a very simple and direct way.

Here is a simple example of a function that is parameterized using a pure variable.

```
define a pure type variable named T = double
define a T function named add
  accepts a T parameter named a
  accepts a T parameter named b
{
  return a + b
}
```

Because the variable is defined as pure, it is allocated immediately, and can be accessed during declarations made in the rest of the code. In the above example, the function return type is assigned using a variable reference. Similarly, the code below may be used for a pure function:

```
define a pure type function named T { return double }
define a T function named add
   accepts a T parameter named a
   accepts a T parameter named b
{
   return a + b
}
```

Pure Parameters and Static/Dynamic Functions

Because words marked with pure will execute immediately, we can apply them to the function parameter in a way that allows its value to be used in other parts of the compile process. A parameter decorated with the pure adjective will be populated immediately from code that calls the function and can be used to create variations based on usage in the code at large. This is the basis for meta compilation in the SSPL, and it is given for free because of the recursive compilation process.

For each unique combination of types or values passed to parameters marked as pure in a function declaration, the compiler will generate a unique function overload. Here is an example of a simple function using this technique, which can be generalized for any type that satisfies the usage of the parameter types in the body of the function:

```
define a type of n function named add
   accepts a pure object parameter named n
   accepts a type of n parameter named m
{
   return n + m
}
add "abc" "def"          // Yields "abcdef" (string)
add 1.1 2.2              // Yields 3.3 (double)
add 10 20                // Yields 30 (integer)
```

Because the parameter n is defined pure, it is allowed to be populated immediately at a call site (where "add" is used) so that the type of function (also pure) can evaluate the value during the compile process, allowing specializations to be created for each unique type sent to n. In the example above, three distinct specializations of the add function are created; one each for a string, a double and an integer respectively.

This is an example of a statically typed dynamic function. Any combination of parameters that support the function "+" will be accepted and yield a distinct version to support it no matter who or where the caller is. The parameter types and function return types are statically known at compile time, but the developer need only describe the underlying usage and not worry about what types can or cannot be supported.

Here is another example, this time the recursive factorial function defined to accept any numeric type:

```
define a type of n function named fact
   accepts a pure object parameter named n
{
   if n = = 0
      then return 1 as type of n
   else
      return n * fact n - 1
}
fact 5                   // Yields 120 (integer)
1.1 + fact 5.0           // Yields 121.1 (double)
```

Note that the type of n is used in the declaration of the function as before, but now is also used in the body as part of a coercion (as). Because we do not know at design time what the return type is, we can similarly use the type of function to determine the parameter type. Since type of is internally marked pure, and because its argument, n, is also marked pure, it can execute immediately to resolve to a type that as can use at compile time. Note that only pure functions can interact with the pure version of n; all other uses of n in the body are using the normal, impure shadow parameter created for the specialization (e.g. integer and double shown).

The ability to define functions devoid of specific type constraints, whether in the definition or at a call site, give the SSPL the ability to write very flexible functions. For instance, the developer may wish to define the word "longer" (in comparison to a numeric value say) to be so broad as to never need to be redefined. They could write:

```
define a boolean function named longer
   accepts a pure object parameter named subject
   accepts a pure object parameter named threshold
{
   return subject length > threshold
}
my_line is longer than 22.4          // Yields true (for a line that is
10.2 in length)
   array_x is longer than 12            // Yields false (for an
array that has 15 elements)
```

So long as the subject passed has a length property that can be compared to whatever value is given by the caller as a comparison, the support function "longer" can be used on it and remain statically bound to the types. The ability to define such broad functions enables the SSPL's long-term ability to expand its capabilities based upon developer use patterns.

General Approach

Functional Model of Language

Embodiments of the invention may base based on the premise that any well-expressed sentence can be treated as a concatenative function assembly. That is, one may assume that words can be identified as being either noble expressions outright, or as participants in a larger expression, to which they contribute as functional parameters. Furthermore, any such notional expression produced by the result of a function invocation can be considered as either of the above for inclusion in higher-level notional constructions going forward.

Figure 3:
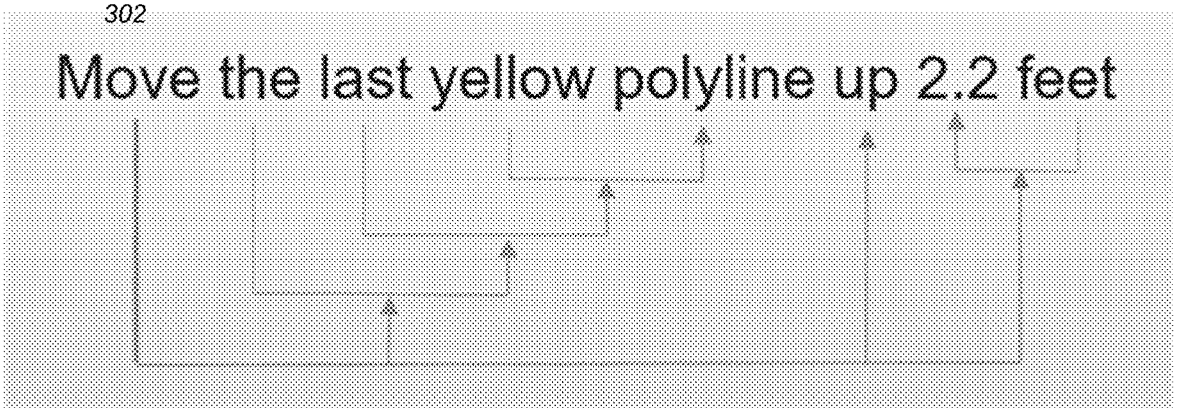
FIG. 3 illustrates an example of a functional composition of an imperative sentence in accordance with one or more embodiments of the invention.

FIG. 3 illustrates an example of a functional composition of an imperative sentence in accordance with one or more embodiments of the invention. Specifically, FIG. 3 depicts an example of a simple sentence which identifies functions (arrow bases) and arguments (arrowhead). At the ultimate apex of this tree is the functional notion move 302, which captures all other sub-notional expressions in the sentence. Embodiments of the invention do not try to make the overly simplistic assumption that verbs are the only form of function; in this example, adjectives, prepositions and determiners are also performing functional operations. SSPL organizes input terms in this way, optimizing against all possible permutations and identifying the most efficient functional representation of a given statement.

Execution Model

Once it has been established that there are words that express and can parameterize other expressions, these expressions are treated as functions, much like in any other execution paradigm. However, the examples above illustrate several functional notions that have no specific meaning beyond interpreting the sentence itself. That is, embodiments of the invention provide for functions that serve only to aid in the disambiguation of other expressions in the sentence. The most obvious example is the determiner ("the"), which serves as functional handle for the noun assembly ("last yellow polyline"). It has functional meaning, but only for the purposes of interpretation. Careful consideration must be given to how these sorts of functions differ from the ones which ultimately yield information to the caller or perform action.

The most basic distinction in the treatment of these functional forms can be boiled down to; at what point do these functional expressions evaluate? The rule of thumb for the SSPPL execution is:

Execute as much as you possibly can immediately and replace the original function assembly with the result.

That is, the lines are blurred here with respect to execution context. Code is permitted to execute at compile-time (inside the compiler) when it can do so. Only those functions whose argument values are not available at compile-time are encoded for late-bound execution. In the case of determiners and adjectives, they can be immediately evaluated since there are no outstanding values to resolve. For example, the statement:

$$10*10$$

It is perfectly acceptable, from an execution standpoint, to replace this expression with the value 100 for all consumers downstream (ignoring any readability/validation issues). This substitution is the functional-programming equivalent of referential transparency. It is possible when all the arguments to the function are immutable and are known a-priori (the C++ language notion of constexpr). Consider the alternate statement:

$$X*10$$

When X is unknown for any, single possible context, it is not possible to make such a substitution. Statements like this, which cannot be evaluated at compile time, must be deferred for execution by emitting the function code to be invoked in the future by callers who do have the argument values to provide. Thus, the ultimate function is expressed into the code stream, only representing that which could not be evaluated at compile-time. This is how the compiler distinguishes between interpretive functions (the "the" example above) and concrete queries and actions to be executed distinctly.

This also means, that if all arguments are available at compile time, then the entire function is compiled, executed and replaced in line with the ultimate value, which is what happens for example when the statement 10*10 is invoked; the compiler simply returns 100, and the only code generated is instructions to push 100 onto the return stack.

Embodiments of the invention also support a fluid "any fix" notation. With respect to the flexibility of the relationship between a function and its arguments, one of the most important challenges is to allow a function to capture its arguments in variety of ways. The function word(s) must be able to precede, intervene and succeed the argument(s) it captures. In spoken languages, computer code and even in mathematical notation we are often unaware of these notational distinctions and naturally accept them as-is. Consider the Pythagorean theorem of right triangles (as described above) which expresses three (3) forms of fixity (prefix, infix, and postfix). It may be noted that computer programming languages typically do not support all forms.

To be truly fluid, embodiments of the invention allow functions and their relations to other terms to support variations in their notations without need to resort to additional syntax, e.g. braces, brackets or parentheses. In other words, the SSPL attempts to address the question of, what if we could support any and all forms of fixity "Set C to the square root of A squared plus B squared"

In the SSPL, this statement compiles and runs.

System Overview

A few simple tenets are adhered to during the expression evaluation process:

(1) Allow a function to participate in any of the three fix positions;
(2) Remove distinction between compile-time and runtime execution (e.g., declaration statements are executed at compile time);
(3) Execute as much as possible at compile time—emit the rest to the code stream;
(4) All code sentences form either expressions (a single evaluation value) or statements (no evaluation value). In this regard all expressions with multiple values expresses those values in an array. Further, there is no distinction between an explicit, declared array, and a code block which generates one;
(5) All code groups are equivalent—because of rule (4), code blocks are data blocks (e.g., ( . . . ), and [ . . . ]).

Stack Based Compiler Graph

As discussed above (and tenet (2)), execution of the code is split into two contexts: compile-time and runtime. Code which can run early will be run; the rest is emitted for deferred execution.

From the intermediate code generated on standpoint, the distinction between compile-time and run-time contexts is almost immaterial; they both target execution on stack machines. The initial compile stages of the SSPL generates stack-based graphs which have identical structure, regardless of whether they can be executed early or not.

Many modern virtual machines, such as JAVA, .NET and WEB ASSEMBLY are built on stack machines. They are extremely powerful and simple to implement and the SSPL employs them to represent execution when necessary to evaluate, and when necessary to emit. The SSPL generates symbols that are compatible with most general-purpose stack machines.

Figure 4:
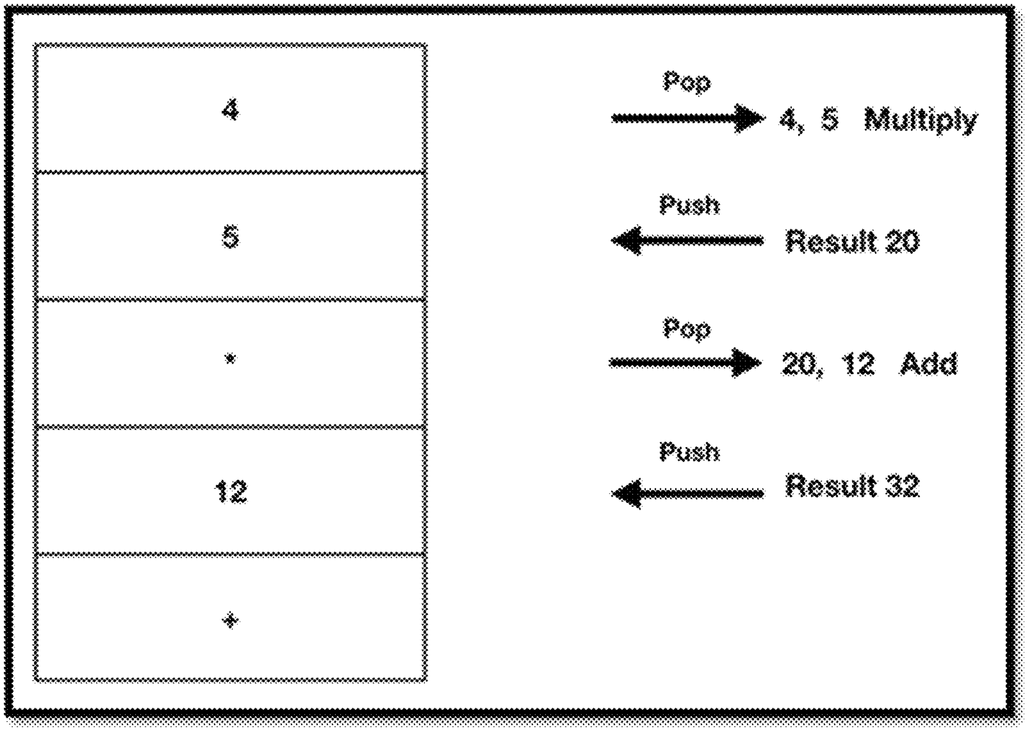
FIG. 4 illustrates a simple stack diagram for the expression in accordance with one or more embodiments of the invention.

FIG. 4 illustrates a simple stack diagram for the expression "4×5+12." Notice that all stack functions operate in postfix notation. As illustrated, the "+" is pushed onto the stack first followed by 12, *, 5, and 4. During processing, the 4, 5, and * (multiply) are popped and the result of 20 is pushed onto the stack. Thereafter, the 12, 12, and +(add) are popped with the result of 32 being pushed onto the stack.

Code Emission

Figure 5:
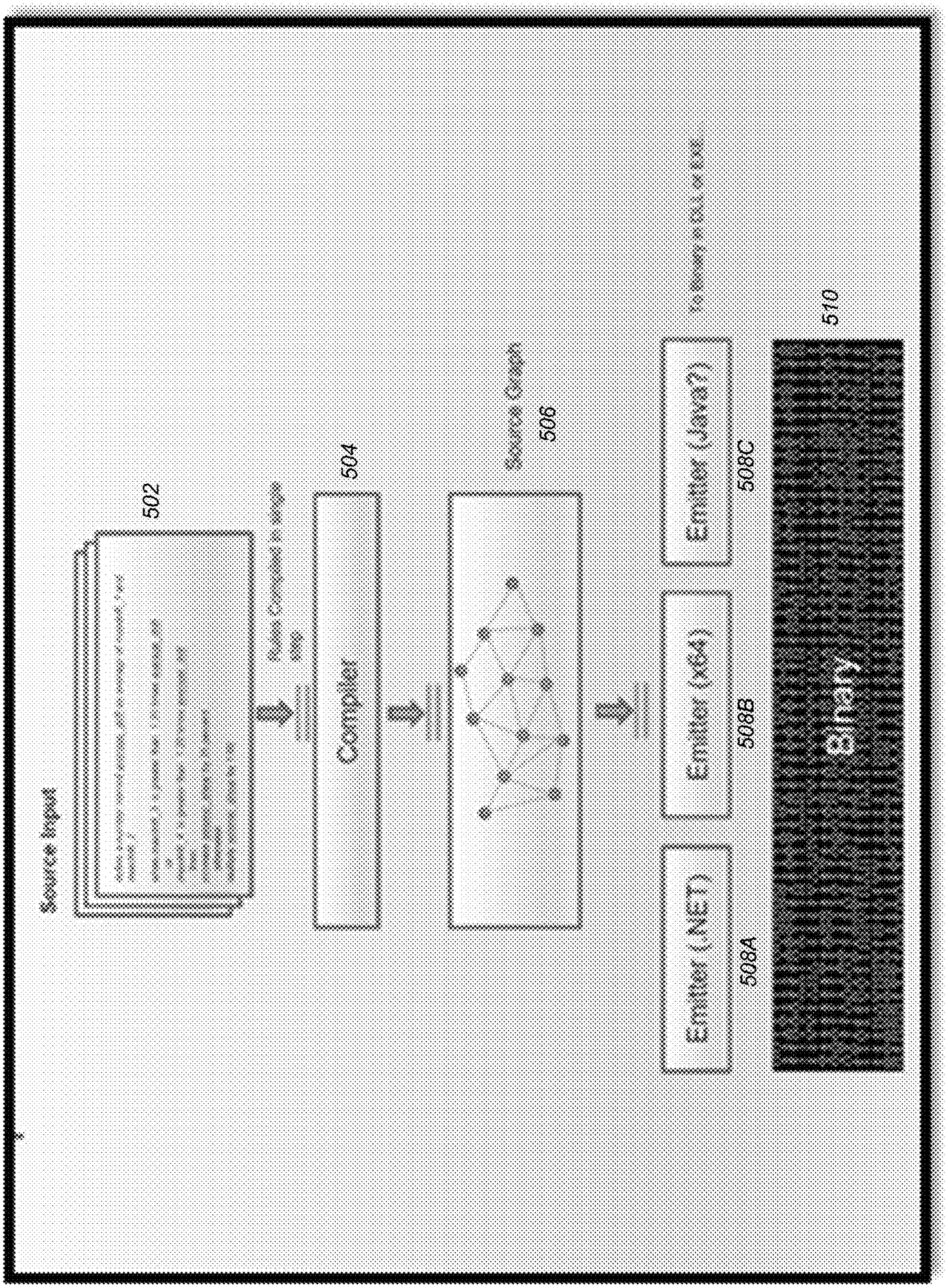
FIG. 5 illustrates an exemplary compilation process in accordance with one or more embodiments of the invention.

Once code is fully resolved and generated to support a stack machine, it may be then emitted to a target such as MICROSOFT's .NET CORE platform for execution on any of the platforms it supports (e.g. WINDOWS, MAC, LINUX, ANDROID and iOS). FIG. 5 illustrates how the SSPL compiles 504 from source input 502 (where rules are compiled in a single step), through the source graph stack machine 506 and into the emitter 508 (i.e., a .NET 508A, x64 508B, or JAVA 508C emitter)(to produce binary 510 [e.g., in a DLL or EXE]) in accordance with one or more embodiments of the invention. Embodiments of the invention may use the .NET emitter 508A to generate its code (or one of the other emitters 508B/508C/ . . . ).

Figure 6:
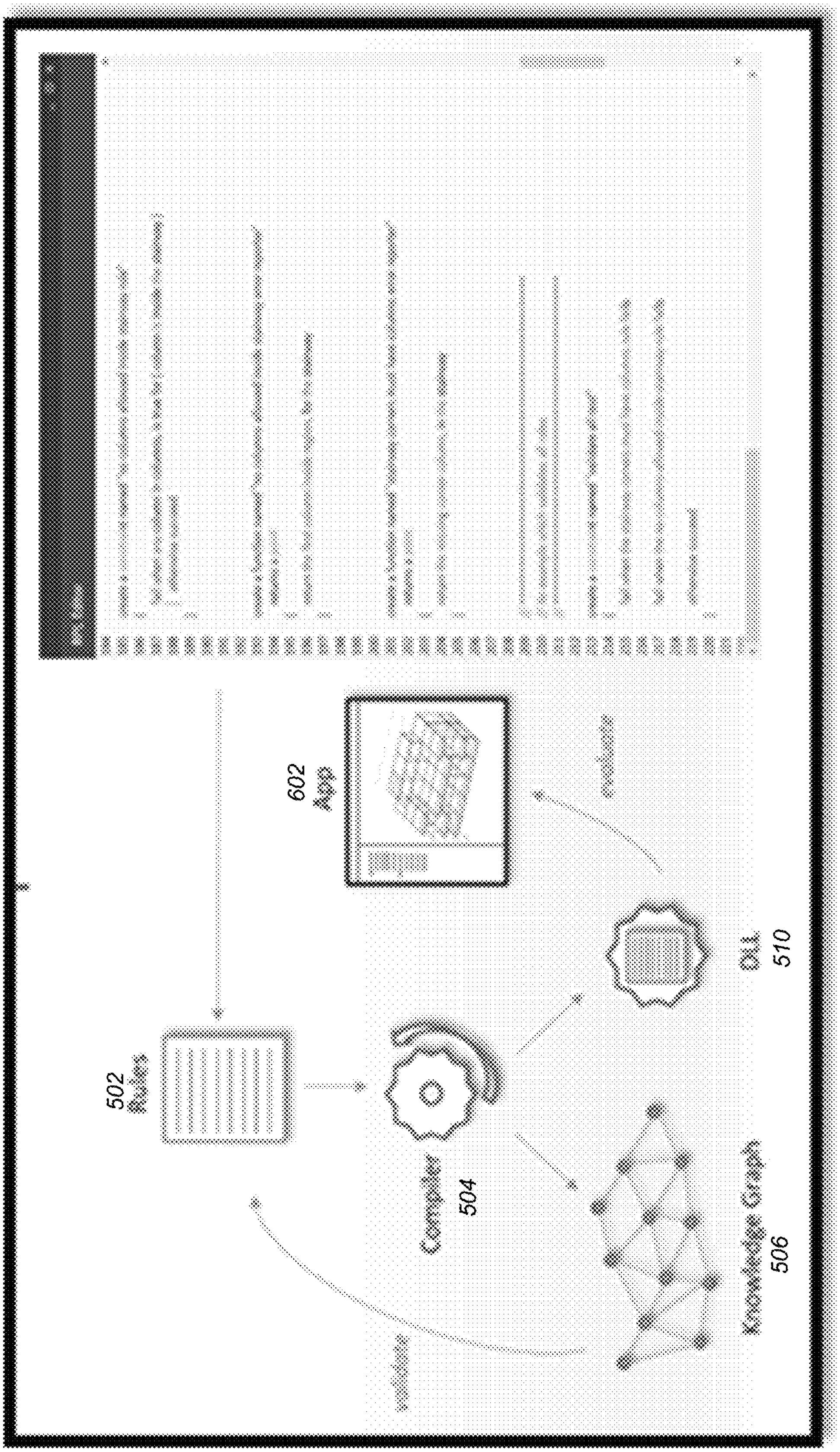
FIG. 6 illustrates the code generation process for the semantic script programming language in accordance with one or more embodiments of the invention.

Once the .NET assembly is created (e.g., it is a .DLL in binary 510), it may be reloaded and executed inside the application at request. This includes the interactive commands that are issued. FIG. 6 illustrates the code generation process for SSPL in accordance with one or more embodiments of the invention. As illustrated, each one of the rule libraries or single commands (i.e., input 502) is compiled 504 to a stack architecture/knowledge graph 506 (which may then be validated via the rules 502, emitted 508 to a .NET assembly (i.e., binary code 510 such as a DLL), loaded into memory (i.e., of application 602), executed/evaluated and unloaded/disposed.

In one or more embodiments, the code may be emitted to a .NET MSIL (intermediate language assembly). Thereafter, the code may be compiled down to discoverable and executable assemblies that can be loaded in WINDOWS, MAC, LINUX, IOS, ANDROID, etc. The assemblies generated this way may be saved, redistributed, loaded, and reloaded as necessary going forward, without the need to recompile.

Logical Flow

Figure 7:
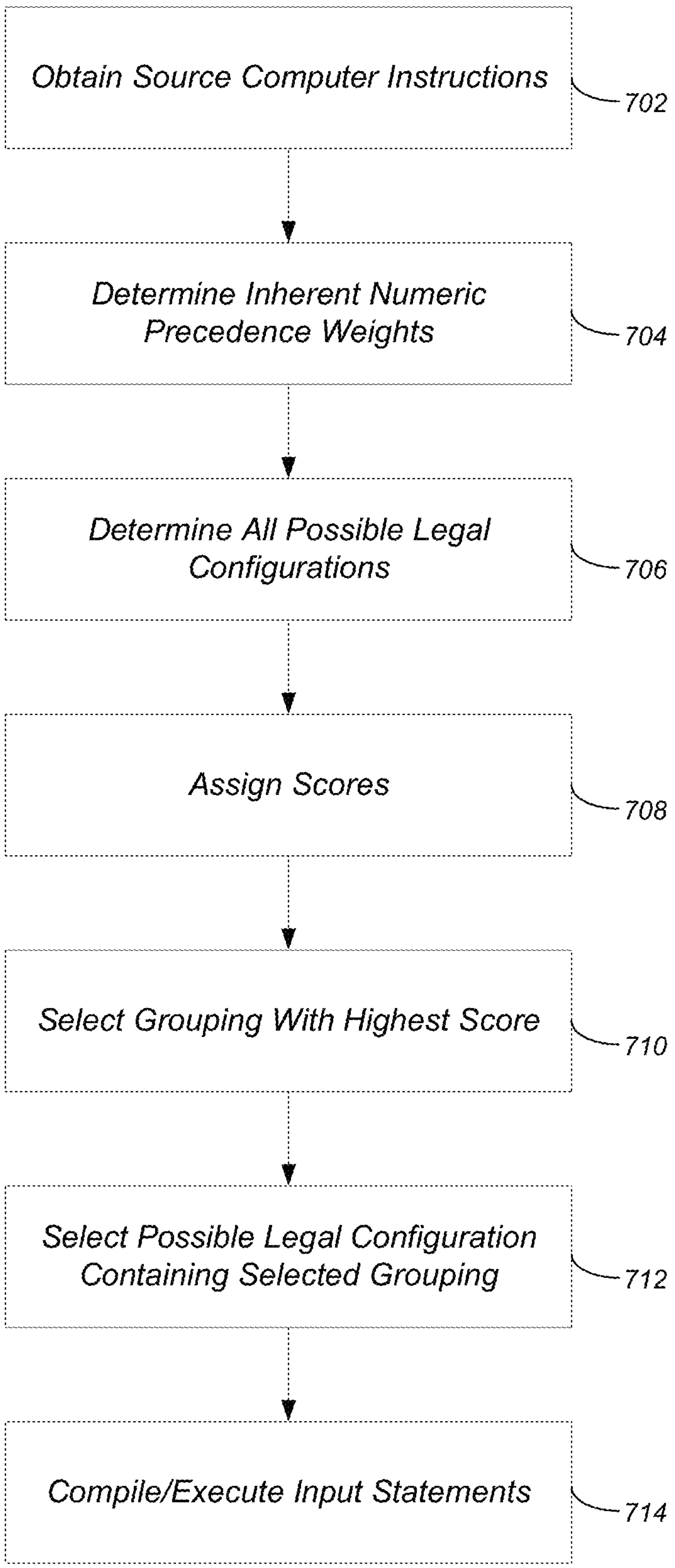
FIG. 7 illustrates the logical flow for processing source computer instructions/code in accordance with one or more embodiments of the invention.

FIG. 7 illustrates the logical flow for processing source computer instructions/code in accordance with one or more embodiments of the invention.

At step 702, the source computer instructions are obtained and consist of one or more input statements. A first input statement (of the one or more input statements) includes two functions and one or more arguments that are consumed by the two functions. Further, the two functions are competing with each other for consumption of the arguments. In one or more embodiments, the first input statement contains natural language words that represent the two functions and the one or more arguments. Further, with natural language words, parts of speech may be defined as grammatical types and/or notional types that may then be used to identify how the natural language words are legally joined in expressions. In addition, in such embodiments, the first input statement may be selected followed by the selection of a function (from the selected first input statement). Thereafter, the selected function and the one or more parameters (accepted by the selected function) may be tagged with the grammatical type of the notional type such that the possible legal configuration is selected (during step 708 below) based on the grammatical type and the notional type and the score determined via a stack based evaluation procedure.

At step 704, for each of the one or more input statements, an inherent numeric precedence weight is determined for each of the two functions and each of the one or more arguments. In one or more embodiments, the inherent numeric precedence weights are based on a mathematical order of operations. For example, exponentiation and root extraction may have the highest precedence, followed by multiplication and division, followed by addition and subtraction (e.g., PEMDAS—parentheses, exponents, multiplication/division, addition/subtraction).

At step 706, for the first input statement, all possible legal configurations of the two functions and the one or more arguments are determined. Each possible legal configuration consists of a different grouping of the two functions with the one or more arguments consumed by each function. In one or more embodiments, parts of speech tags may be used to determine a legality of the selected possible legal configuration.

At step 708, a score is assigned to each of the different groupings. The score is a sum of the inherent numeric precedence weights within each different grouping. Alternatively (or in addition), the score may further include a sum of the inherent numeric precedence weights with an affinity weight that is based on a proximity between two terms (where the terms consist of a function and/or argument). In this regard, the affinity weight is heavier (greater) the closer the two terms are to each other relative to more distal terms.

The score may further consist of a sum of the inherent numeric precedence weights with a symmetry weight that consists of an additional weight added to a sub-expression that is repeated within a possible legal configuration. Such a sub-expression may consist of a sequence of one or more of the functions and one or more of the arguments.

At step 710, the different grouping having the highest score is selected.

At step 712, the possible legal configuration containing the selected different grouping is selected.

At step 714, the one or more input statements are compiled into executable code and/or executed using the selected different grouping containing the selected possible legal configuration. In one or more embodiments, the functions and arguments comprise words. During the compiling, the words may be executed in an iterative, recursive procedure such that a compiler acts as an iterative single pass compiler. Further, the compiling may process all of the parts of speech in a consistent manner such that the parts of speech consisting of natural language words are processed based on grammatical language rules (e.g., the computer understands both natural language and traditional coded input statements).

In addition to the above, the inherent numeric precedence weights may be initially fixed in step 704. Thereafter, a pattern may be recognized based on a consistency of the possible legal configuration that is selected. The inherent numeric precedence weights may be modified (based on the pattern) and utilized when compiling new input statements (e.g., the compiler may access/maintain a library/database with the inherent numeric precedence weights and/or patterns).

Within steps 702-714, embodiments of the invention may also maintain a winner list. The selected different grouping having the highest score is placed into the winner list while maintaining a relative order. Remaining elements are then found/identified. Such remaining elements consist of: (i) remaining words in the selected possible legal configuration, if any; (ii) remaining groupings in the selected possible legal configuration, if any; (iii) remaining arguments of the one or more arguments in the selected possible legal configuration, if any; and (iv) remaining functions of the two functions in the selected possible legal configuration, if any. When utilizing a winner list, the remaining elements do not overlap with other elements or groupings already placed in the winner list. The remaining element that is viable AND has the highest score is then selected. As used herein (and as described above), a viable remaining element consists of a remaining element that can stand alone. The selected remaining element is then placed in the winner list (while maintaining the relative order). This process (i.e., the identification of the remaining elements, selection of the viable and highest scoring remaining element, and placement of the selected element into the winner list) is then repeated until all viable remaining elements are placed into the winner list. The winner list is then utilized to determine the precedence during compiling.

Further to the above, at least one of the different groupings may comprise/resolve to a new argument that is consumed by an adjacent unevaluated function. That new argument may then be used as a basis for recursion and generational compilation.

Hardware Environment

Figure 8:
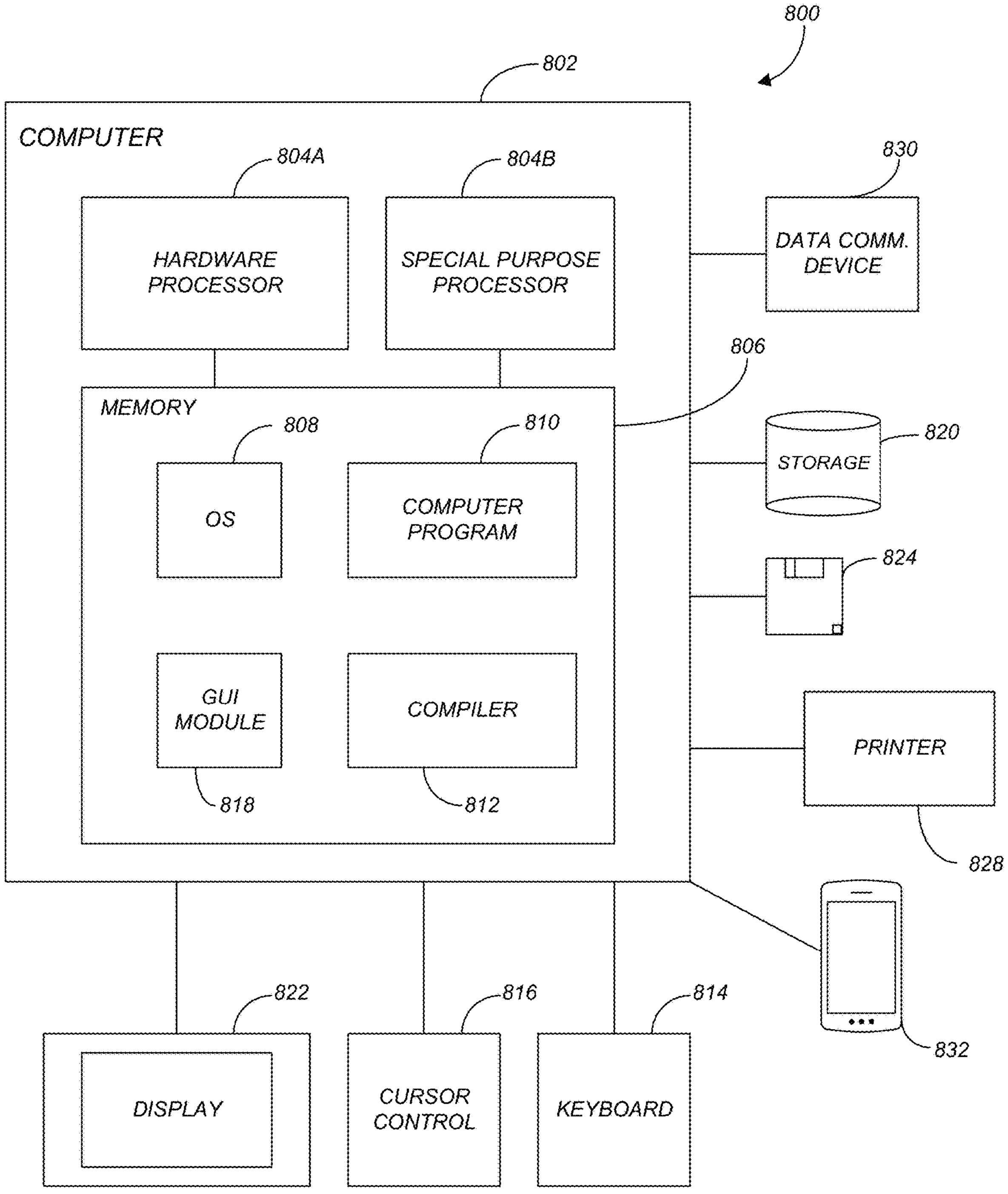
FIG. 8 is an exemplary hardware and software environment used to implement one or more embodiments of the invention.

FIG. 8 is an exemplary hardware and software environment 800 (referred to as a computer-implemented system and/or computer-implemented method) used to implement one or more embodiments of the invention. The hardware and software environment includes a computer 802 and may include peripherals. Computer 802 may be a user/client computer, server computer, or may be a database computer. The computer 802 comprises a hardware processor 804A and/or a special purpose hardware processor 804B (hereinafter alternatively collectively referred to as processor 804) and a memory 806, such as random access memory (RAM). The computer 802 may be coupled to, and/or integrated with, other devices, including input/output (I/O) devices such as a keyboard 814, a cursor control device 816 (e.g., a mouse, a pointing device, pen and tablet, touch screen, multi-touch device, etc.) and a printer 828. In one or more embodiments, computer 802 may be coupled to, or may comprise, a portable or media viewing/listening device 832 (e.g., an MP3 player, IPOD, NOOK, portable digital video player, cellular device, personal digital assistant, etc.). In yet another embodiment, the computer 802 may comprise a multi-touch device, mobile phone, gaming system, internet enabled television, television set top box, or other internet enabled device executing on various platforms and operating systems.

In one embodiment, the computer 802 operates by the hardware processor 804A performing instructions defined by the computer program 810 (e.g., a computer-aided design [CAD] application) under control of an operating system 808. The computer program 810 and/or the operating system 808 may be stored in the memory 806 and may interface with the user and/or other devices to accept input and commands and, based on such input and commands and the instructions defined by the computer program 810 and operating system 808, to provide output and results.

Output/results may be presented on the display 822 or provided to another device for presentation or further processing or action. In one embodiment, the display 822 comprises a liquid crystal display (LCD) having a plurality of separately addressable liquid crystals. Alternatively, the display 822 may comprise a light emitting diode (LED) display having clusters of red, green and blue diodes driven together to form full-color pixels. Each liquid crystal or pixel of the display 822 changes to an opaque or translucent state to form a part of the image on the display in response to the data or information generated by the processor 804 from the application of the instructions of the computer program 810 and/or operating system 808 to the input and commands. The image may be provided through a graphical user interface (GUI) module 818. Although the GUI module 818 is depicted as a separate module, the instructions performing the GUI functions can be resident or distributed in the operating system 808, the computer program 810, or implemented with special purpose memory and processors.

In one or more embodiments, the display 822 is integrated with/into the computer 802 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 802 according to the computer program 810 instructions may be implemented in a special purpose processor 804B. In this embodiment, some or all of the computer program 810 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement the present invention. Further, the special purpose processor 804B may be a hybrid processor, which includes dedicated circuitry for performing a subset of functions, and other circuits for performing more general functions such as responding to computer program 810 instructions. In one embodiment, the special purpose processor 804B is an application specific integrated circuit (ASIC).

The computer 802 may also implement a compiler 812 that allows an application or computer program 810 written in the SSPL (or other programming language such as C, C++, Assembly, SQL, PYTHON, PROLOG, MATLAB, RUBY, RAILS, HASKELL) to be translated into processor 804 readable code. Alternatively, the compiler 812 may be an interpreter that executes instructions/source code directly, translates source code into an intermediate representation that is executed, or that executes stored precompiled code. Such source code may be written in a variety of programming languages such as SSPL, JAVA, JAVASCRIPT, PERL, BASIC, etc. After completion, the application or computer program 810 accesses and manipulates data accepted from I/O devices and stored in the memory 806 of the computer 802 using the relationships and logic that were generated using the compiler 812.

The computer 802 also optionally comprises an external communication device such as a modem, satellite link, Ethernet card, or other device for accepting input from, and providing output to, other computers 802.

In one embodiment, instructions implementing the operating system 808, the computer program 810, and the compiler 812 are tangibly embodied in a non-transitory computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of computer program 810 instructions which, when accessed, read and executed by the computer 802, cause the computer 802 to perform the steps necessary to implement and/or use the present invention or to load the program of instructions into a memory 806, thus creating a special purpose data structure causing the computer 802 to operate as a specially programmed computer executing the method steps described herein. Computer program 810 and/or operating instructions may also be tangibly embodied in memory 806 and/or data communications devices 830, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 802.

Figure 9:
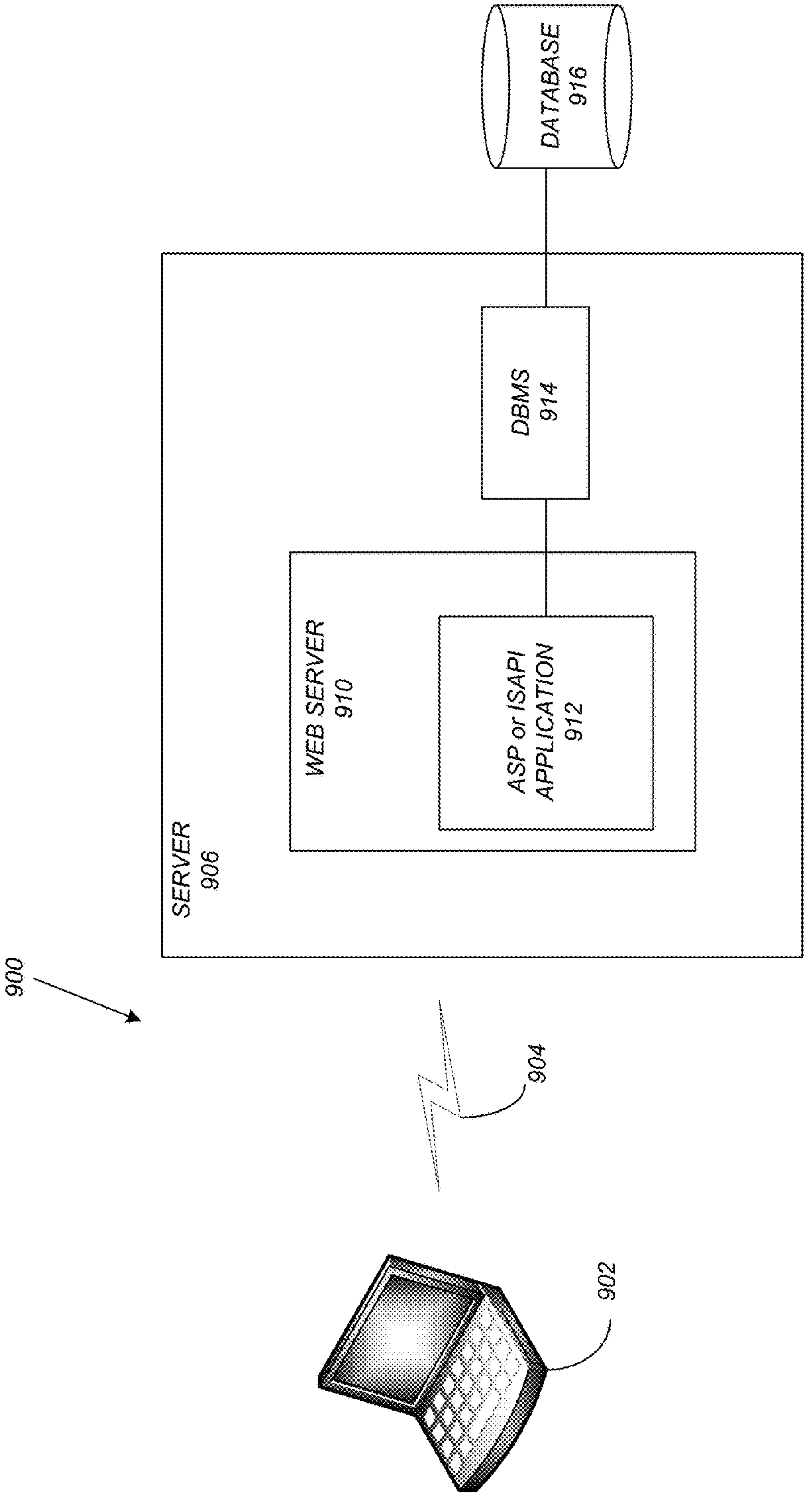
FIG. 9 schematically illustrates a typical distributed/cloud-based computer system in accordance with one or more embodiments of the invention.

FIG. 9 schematically illustrates a typical distributed/cloud-based computer system 900 using a network 904 to connect client computers 902 to server computers 906. A typical combination of resources may include a network 904 comprising the Internet, LANs (local area networks), WANs (wide area networks), SNA (systems network architecture) networks, or the like, clients 902 that are personal computers or workstations (as set forth in FIG. 8), and servers 906 that are personal computers, workstations, minicomputers, or mainframes (as set forth in FIG. 8). However, it may be noted that different networks such as a cellular network (e.g., GSM [global system for mobile communications] or otherwise), a satellite based network, or any other type of network may be used to connect clients 902 and servers 906 in accordance with embodiments of the invention.

A network 904 such as the Internet connects clients 902 to server computers 906. Network 904 may utilize ethernet, coaxial cable, wireless communications, radio frequency (RF), etc. to connect and provide the communication between clients 902 and servers 906. Further, in a cloud-based computing system, resources (e.g., storage, processors, applications, memory, infrastructure, etc.) in clients 902 and server computers 906 may be shared by clients 902, server computers 906, and users across one or more networks. Resources may be shared by multiple users and can be dynamically reallocated per demand. In this regard, cloud computing may be referred to as a model for enabling access to a shared pool of configurable computing resources.

Clients 902 may execute a client application or web browser and communicate with server computers 906 executing web servers 910. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 902 may be downloaded from server computer 906 to client computers 902 and installed as a plug-in or ACTIVEX control of a web browser. Accordingly, clients 902 may utilize ACTIVEX components/component object model (COM) or distributed COM (DCOM) components to provide a user interface on a display of client 902. The web server 910 is typically a program such as MICROSOFT'S INTERNET INFORMATION SERVER.

Web server 910 may host an Active Server Page (ASP) or Internet Server Application Programming Interface (ISAPI) application 912, which may be executing scripts. The scripts invoke objects that execute business logic (referred to as business objects). The business objects then manipulate data in database 916 through a database management system (DBMS) 914. Alternatively, database 916 may be part of, or connected directly to, client 902 instead of communicating/obtaining the information from database 916 across network 904. When a developer encapsulates the business functionality into objects, the system may be referred to as a component object model (COM) system. Accordingly, the scripts executing on web server 910 (and/or application 912) invoke COM objects that implement the business logic. Further, server 906 may utilize MICROSOFT'S TRANSACTION SERVER (MTS) to access required data stored in database 916 via an interface such as ADO (Active Data Objects), OLE DB (Object Linking and Embedding DataBase), or ODBC (Open DataBase Connectivity).

Generally, these components 900-916 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 902 and 906 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 902 and 906. Embodiments of the invention are implemented as a software/CAD application on a client 902 or server computer 906. Further, as described above, the client 902 or server computer 906 may comprise a thin client device or a portable device that has a multi-touch-based display.

CONCLUSION

This concludes the description of the preferred embodiment of the invention. Some alternative embodiments for accomplishing the present invention may include any type of computer, such as a mainframe, minicomputer, or personal computer, or computer configuration, such as a timesharing mainframe, local area network, or standalone personal computer, could be used with the present invention.

In view of the above, embodiments of the invention may provide one or all of the above via SSLP:

(1) Functions may accept their arguments in any of three (3) configurations: prefix, infix, and postfix, without explicit specification syntax (i.e., at use, there is no additional symbology to indicate which form is indicated);

(2) The inherent ambiguity caused when an input can be interpreted in more than a single legal arrangement, because of (1), is resolved through an assignment optimization;

(3) Each given configuration of a function/argument set is assigned a set of weights based upon: (a) precedence weight, specifically assigned to each orientation; (b) affinity weight, defined by proximity of the terms; (c) symmetry weight, defined by how often the terms repeat within the statement; and (d) parts of speech tags are used to determine the legality of a given function/argument configuration. For instance, determiners/articles must precede a noun/qualified noun).

(4) The weights are used by the assignment optimization to provide a score for a given function/argument configuration. The score is used in the optimization thus: (a) Find the viable* word or aggregate with the highest score (as described above)—(i) Place the winner in the winner list, maintaining relative order; (b) Find any remaining viable word or aggregate with the highest score that does not overlap any aggregates already placed in the winner list—(i) Place it in the winners list, maintaining relative order; and (c) Repeat until all viable words and aggregates are placed. Note: A viable word or aggregate is one that can stand alone (e.g., "equals" cannot stand along because it requires two arguments, and they are not filled.)

(5) Each function/argument configuration produces an expression of its own that may be used as an argument in an adjacent function. The precedence score of the consumed function/aggregate configuration is added to the consuming function precedence score for consideration in the higher order optimization round.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for processing source computer instructions, comprising:

(a) obtaining the source computer instructions comprising one or more input statements, wherein:

(1) a first input statement of the one or more input statements comprises two functions;

(2) the first input statement comprises one or more arguments that are consumed by the two functions; and (3) the two functions are competing with each other for consumption of the one or more arguments;

(b) determining, for the first input statement, an inherent numeric precedence weight for each of the two functions and each of the one or more arguments;

(c) for the first input statement, determining all possible legal configurations of the two functions and the one or more arguments, wherein each possible legal configuration comprises a different grouping of the two functions with the one or more arguments consumed by each function;

(d) assigning a score to each of the different groupings, wherein the score comprises a sum of inherent numeric precedence weights within each different grouping;

(e) selecting the different grouping having the highest score;

(f) selecting the possible legal configuration containing the selected different grouping; and (g) determining that a first function of the two functions can be evaluated to yield a non-variable value;

(h) determining that a second function of the two functions cannot be evaluated to yield a non-variable value;

(i) compiling the first input statement into executable code using the selected different grouping containing the selected possible legal configuration, wherein during the compiling:

(1) the first function is executed; and (2) instructions are emitted to execute the second function at an indeterminate time.

2. The computer-implemented method of claim 1, wherein the first input statements comprises natural language words that represent the two functions and the one or more arguments.

3. The computer-implemented method of claim 2, wherein:

parts of speech are defined as grammatical types and notional types; and the grammatical types and the notional types are used to identify how the natural language words are legally joined in expressions.

4. The computer-implemented method of claim 3, further comprising:

selecting the first input statement;

selecting one of the two functions in the selected first input statement; and tagging the selected function and the one or more parameters accepted by the selected function with the grammatical type or the notional type, wherein the possible legal configuration is selected based on the grammatical type and the notional type and the score determined via a stack based evaluation procedure.

5. The computer-implemented method of claim 3, wherein:

the compiling processes all of the parts of speech in a consistent manner; and the parts of speech comprising natural language words are processed based on grammatical language rules.

6. The computer-implemented method of claim 2, wherein:

parts of speech tags are used to determine a legality of the selected possible legal configuration.

7. The computer-implemented method of claim 1, wherein the inherent numeric precedence weights are based on mathematical order of operations.

8. The computer-implemented method of claim 1, further comprising:

initially fixing the inherent numeric precedence weights;

recognizing a pattern based on a consistency of the possible legal configuration that is selected;

modifying the inherent numeric precedence weights based on the pattern; and utilizing the modified inherent numeric precedence weights when compiling new input statements.

9. The computer-implemented method of claim 1, wherein:

the score further comprises a sum of the inherent numeric precedence weights with an affinity weight;

the affinity weight is based on a proximity between two terms;

each of the two terms comprises one of the two functions or one of the one or more arguments;

the affinity weight is heavier the closer the two terms are to each other relative to more distal terms.

10. The computer-implemented method of claim 1, wherein:

the score further comprises a sum of the inherent numeric precedence weights with a symmetry weight;

the symmetry weight comprises an additional weight added to a sub-expression that is repeated within a possible legal configuration; and the sub-expression comprises a sequence of one or more of the functions and one or more of the arguments.

11. The computer-implemented method of claim 1, wherein:

at least one of the different groupings comprises a new argument that is consumed by an adjacent unevaluated function; and the new argument is used a basis for recursion and generational compilation.

12. The computer-implemented method of claim 1, further comprising:

(i) maintaining a winner list;

(ii) placing the selected different grouping having the highest score into the winner list while maintaining a relative order;

(iii) finding remaining elements, wherein:

the remaining elements comprise:

remaining words in the selected possible legal configuration, if any;

remaining groupings in the selected possible legal configuration, if any;

remaining arguments of the one or more arguments in the selected possible legal configuration, if any; and remaining functions of the two functions in the selected possible legal configuration, if any;

the remaining elements do not overlap with other elements or groupings already placed in the winner list;

(iv) selecting, from the remaining elements, the remaining element that is viable and has the highest score, wherein a viable remaining element comprises a remaining element that can stand alone;

(v) placing the selected remaining element in the winner list, while maintaining the relative order;

(vi) repeating steps (iii)-(vi) until all viable remaining elements are placed into the winner list; and (vii) utilizing the winner list to determine the precedence during compiling.

13. The computer-implemented method of claim 1, wherein:

the two functions and one or more arguments comprise words; and the compiling further comprises executing, for the first input statement, the words during compile time in an iterative, recursive procedure such that a compiler acts as an iterative single pass compiler.

14. A computer-implemented system for processing source computer instructions, comprising:

(a) a computer having a memory;

(b) a processor executing on the computer;

(c) the memory storing a set of instructions, wherein the set of instructions, when executed by the processor cause the processor to perform operations comprising:

(1) obtaining the source computer instructions comprising one or more input statements, wherein:

(i) a first input statement of the one or more input statements comprises two functions;

(ii) the first input statement comprises one or more arguments that are consumed by the two functions; and (iii) the two functions are competing with each other for consumption of the one or more arguments;

(2) determining, for the first input statement, an inherent numeric precedence weight for each of the two functions and each of the one or more arguments;

(3) for each of the one or more input statements, determining all possible legal configurations of the two functions and the one or more arguments, wherein each possible legal configuration comprises a different grouping of the two functions with the one or more arguments consumed by each function;

(4) assigning a score to each of the different groupings, wherein the score comprises a sum of inherent numeric precedence weights within each different grouping;

(5) selecting the different grouping having the highest score;

(6) selecting the possible legal configuration containing the selected different grouping;

(7) determining that a first function of the two functions can be evaluated to yield a non-variable value;

(8) determining that a second function of the two functions cannot be evaluated to yield a non-variable value;

(9) compiling the first input statement into executable code using the selected different grouping containing the selected possible legal configuration, wherein during the compiling:

(i) the first function is executed; and (ii) instructions are emitted to execute the second function at an indeterminate time.

15. The computer-implemented system of claim 14, wherein the first input statement comprises natural language words that represent the two functions and the one or more arguments.

16. The computer-implemented system of claim 15, wherein:

parts of speech are defined as grammatical types and notional types;

the grammatical types and the notional types are used to identify how the natural language words are legally joined in expressions.

17. The computer-implemented system of claim 16, wherein the operations further comprise:

selecting the first input statement;

selecting one of the two functions in the selected first input statement; and tagging the selected function and the one or more parameters accepted by the selected function with the grammatical type or the notional type, wherein the possible legal configuration is selected based on the grammatical type and the notional type and the score determined via a stack based evaluation procedure.

18. The computer-implemented system of claim 16, wherein:

the compiling processes all of the parts of speech in a consistent manner; and the parts of speech comprising natural language words are processed based on grammatical language rules.

19. The computer-implemented system of claim 16, wherein:

parts of speech tags are used to determine a legality of the selected possible legal configuration.

20. The computer-implemented system of claim 14, wherein the inherent numeric precedence weights are based on mathematical order of operations.

21. The computer-implemented system of claim 14, wherein the operations further comprise:

initially fixing the inherent numeric precedence weights;

recognizing a pattern based on a consistency of the possible legal configuration that is selected;

modifying the inherent numeric precedence weights based on the pattern; and utilizing the modified inherent numeric precedence weights when compiling new input statements.

22. The computer-implemented system of claim 14, wherein:

the score further comprises a sum of the inherent numeric precedence weights with an affinity weight;

the affinity weight is based on a proximity between two terms;

each of the two terms comprises one of the two functions or one of the one or more arguments;

the affinity weight is heavier the closer the two terms are to each other relative to more distal terms.

23. The computer-implemented system of claim 14, wherein:

the score further comprises a sum of the inherent numeric precedence weights with a symmetry weight;

the symmetry weight comprises an additional weight added to a sub-expression that is repeated within a possible legal configuration; and the sub-expression comprises a sequence of one or more of the functions and one or more of the arguments.

24. The computer-implemented system of claim 14, wherein:

at least one of the different groupings comprises a new argument that is consumed by an adjacent unevaluated function; and the new argument is used a basis for recursion and generational compilation.

25. The computer-implemented system of claim 14, wherein the operations further comprise:

(i) maintaining a winner list;

(ii) placing the selected different grouping having the highest score into the winner list while maintaining a relative order;

(iii) finding remaining elements, wherein:

the remaining elements comprise:

remaining words in the selected possible legal configuration, if any;

remaining groupings in the selected possible legal configuration, if any;

remaining arguments of the one or more arguments in the selected possible legal configuration, if any; and remaining functions of the two functions in the selected possible legal configuration, if any;

the remaining elements do not overlap with other elements or groupings already placed in the winner list;

(iv) selecting, from the remaining elements, the remaining element that is viable and has the highest score, wherein a viable remaining element comprises a remaining element that can stand alone;

(v) placing the selected remaining element in the winner list, while maintaining the relative order;

(vi) repeating steps (iii)-(vi) until all viable remaining elements are placed into the winner list; and (vii) utilizing the winner list to determine the precedence during compiling.

26. The computer-implemented system of claim 14, wherein:

the two functions and one or more arguments comprise words; and the compiling further comprises executing, for the first input statement, the words during compile time in an iterative, recursive procedure such that a compiler acts as an iterative single pass compiler.

* * * * *